US008635059B2

(12) United States Patent
Estelle et al.

(10) Patent No.: US 8,635,059 B2
(45) Date of Patent: Jan. 21, 2014

(54) PROVIDING ALTERNATIVE TRANSLATIONS

(75) Inventors: Joshua Estelle, San Francisco, CA (US);
Shankar Kumar, Forest Hills, NY (US);
Wolfgang Macherey, Sunnyvale, CA (US); Franz Josef Och, Palo Alto, CA (US); Peng Xu, San Jose, CA (US);
Awaneesh Verma, Mountain View, CA (US)

(73) Assignee: Google Inc., Mountain View, CA (US)

( * ) Notice: Subject to any disclaimer, the term of this patent is extended or adjusted under 35 U.S.C. 154(b) by 124 days.

(21) Appl. No.: 13/046,468

(22) Filed: Mar. 11, 2011

(65) Prior Publication Data
US 2012/0123765 A1  May 17, 2012

Related U.S. Application Data

(63) Continuation of application No. 12/946,835, filed on Nov. 15, 2010.

(51) Int. Cl.
*G06F 17/28* (2006.01)

(52) U.S. Cl.
USPC .................................. 704/2; 704/4

(58) Field of Classification Search
USPC ........................................ 704/1–10
See application file for complete search history.

(56) References Cited

U.S. PATENT DOCUMENTS

| | | | | |
|---|---|---|---|---|
| 5,854,997 A * | 12/1998 | Sukeda et al. | ..................... | 704/3 |
| 6,266,642 B1 * | 7/2001 | Franz et al. | ..................... | 704/277 |
| 7,107,204 B1 * | 9/2006 | Liu et al. | ........................... | 704/2 |
| 7,272,377 B2 * | 9/2007 | Cox et al. | ....................... | 455/403 |
| 7,340,388 B2 | 3/2008 | Soricut et al. | | |
| 7,359,849 B2 * | 4/2008 | Palmquist | ......................... | 704/5 |
| 2001/0056352 A1 * | 12/2001 | Xun | .............................. | 704/277 |
| 2004/0030542 A1 * | 2/2004 | Fuji | ................................ | 704/2 |
| 2005/0065772 A1 * | 3/2005 | Atkin et al. | ....................... | 704/2 |
| 2005/0131673 A1 * | 6/2005 | Koizumi et al. | ................... | 704/2 |
| 2005/0256698 A1 | 11/2005 | Becks | | |
| 2005/0283365 A1 * | 12/2005 | Mizutani et al. | .............. | 704/257 |
| 2008/0147377 A1 * | 6/2008 | Okura et al. | ...................... | 704/3 |
| 2008/0195372 A1 * | 8/2008 | Chin et al. | ......................... | 704/2 |
| 2009/0063128 A1 * | 3/2009 | Seo et al. | ........................... | 704/2 |
| 2009/0204386 A1 | 8/2009 | Seligman et al. | | |

OTHER PUBLICATIONS

PCT International Search Report and Written Opinion dated Mar. 26, 2012 for PCT International Application No. PCT/US2011/060739, 6 pages.

* cited by examiner

*Primary Examiner* — Jialong He
(74) *Attorney, Agent, or Firm* — Remarck Law Group PLC

(57) ABSTRACT

Methods, systems, and apparatus, including computer programs encoded on a computer storage medium, for presenting alternative translations. In one aspect, a method includes receiving source language text; receiving translated text corresponding to the source language text from a machine translation system; receiving segmentation data for the translated text, wherein the segmentation data includes a first segmentation of the translated text, the first segmentation dividing the translated text into two or more segments; receiving one or more alternative translations for each of the two or more segments; presenting the source text and the translated text to a user in a user interface; and in response to a user selection of a first portion of the translated text, displaying, in the user interface, one or more alternative translations for a first segment to which the first portion of translated text corresponds according to the first segmentation.

38 Claims, 14 Drawing Sheets

PROVIDING ALTERNATIVE TRANSLATIONS

CROSS REFERENCE TO RELATED APPLICATION

This application is a continuation application of, and claims priority to, U.S. patent application Ser. No. 12/946,835, filed on Nov. 15, 2010, entitled "Providing Alternative Translations." The disclosure of the foregoing application is incorporated herein by reference in its entirety.

BACKGROUND

This specification relates to machine translations of source language text.

Machine translation systems generally operate with the goal of creating the best translation possible for a given piece of text in a source language. In order to generate the best translation, a machine translation system may consider many alternative translations for a given portion of the source language text. In some cases, a particular user of the machine translation system may prefer one of these alternative translations to the translation created by the system.

SUMMARY

This specification describes technologies relating to providing alternative machine-generated translations.

In general, one innovative aspect of the subject matter described in this specification can be embodied in methods that include the actions of receiving source language text; receiving translated text corresponding to the source language text from a machine translation system; receiving segmentation data for the translated text, wherein the segmentation data includes a first segmentation of the translated text, the first segmentation dividing the translated text into two or more segments; receiving one or more alternative translations for each of the two or more segments; presenting the source text and the translated text to a user in a user interface; and in response to a user selection of a first portion of the translated text, displaying, in the user interface, one or more alternative translations for a first segment to which the first portion of translated text corresponds according to the first segmentation. Other embodiments of this aspect include corresponding systems, apparatus, and computer programs, configured to perform the actions of the methods, encoded on computer storage devices.

These and other embodiments can each optionally include one or more of the following features. The machine translation system is a statistical machine translation system. In response to a user action identifying a second portion of the translated text, highlighting, in the user interface, a second segment of the translated text to which the second portion of the translated text corresponds according to the first segmentation. Highlighting the second segment includes any one of displaying a box around the second segment, changing the color of the text of the second segment, or changing a background color of the second segment. In response to a user selection of an alternative translation, replacing the first segment with the selected alternative translation in the presented translated text. Each alternative translation is associated with a respective translation score; and the method further comprises displaying alternative translations in an order based on the respective translation scores. The segmentation data includes a plurality of possible segmentations of the translated text. Presenting a user interface feature allowing the user to select one of the plurality of possible segmentations; and in response to a user input selecting one of the plurality of possible segmentations, indicating the selected possible segmentation in the presented translated text. The user interface feature is a plurality of radio buttons or a slider having a plurality of positions. Setting the selected possible segmentation to be the first segmentation. Receiving alignment data identifying portions of the source text that correspond to each segment of the first segmentation; and in response to a user interaction with a third portion of the translated text, highlighting a portion of the source text that corresponds to a third segment of the translated text based on the alignment data, the third segment including the third portion of the translated text. In response to a user action identifying a portion of the source text, highlighting a corresponding segment of the translated text based on the alignment data. In response to a user selection of a fourth portion of translated text that does not correspond to any of the two or more segments associated with the first segmentation, requesting one or more alternative translations for the fourth portion of translated text from the machine translation system; and displaying the one or more alternative translations for the fourth portion of translated text in the user interface. In response to a user selection of a fifth portion of translated text, presenting an input field to allow the user to enter a translation for the segment corresponding to the fifth portion of translated text.

In general, another aspect of the subject matter described in this specification can be embodied in methods that include the actions of receiving data identifying source language text; receiving a translation for the source language text from a machine translation system, the translation including translated text corresponding to the source language text and segmentation data for the translated text, wherein the segmentation data includes a first segmentation of the translated text, the first segmentation dividing the translated text into two or more segments; receiving one or more alternative translations for each of the two or more segments of the first segmentation; and sending executable instructions that, when executed by a user device, cause the user device to perform operations comprising: presenting the source language text and the translated text in a user interface; and in response to a user selection of a first portion of the translated text, presenting in the user interface one or more alternative translations for a first segment to which the first portion of the translated text corresponds according to the first segmentation. Other embodiments of this aspect include corresponding systems, apparatus, and computer programs, configured to perform the actions of the methods, encoded on computer storage devices.

These and other embodiments can each optionally include one or more of the following features. The data identifying source language text is received from the user device. The executable instructions are a client-side script, client-executable Java, or native client instructions executable on a native client. The machine translation system is a statistical machine translation system. In response to a user action identifying a second portion of the translated text, highlighting in the user interface a second segment of the translated text to which the second portion of the translated text corresponds according to the second segmentation. Receiving a translation further comprises receiving alignment data from the machine translation system that identifies portions of the source text that correspond to each of the two or more segments; and the operations further comprise, in response to a user action identifying a third portion of the translated text, highlighting a portion of the source text corresponding to a third segment of the translated text, the third segment including the third portion of translated text. In response to a user action identifying a portion of the source text, highlighting a corresponding segment of the translated text. Receiving one or more alternative translations includes receiving a respective translation score for each alternative translation. Presenting the one or more alternative translations in an order based on the respective translation scores. In response to a user selection of one of the alternative translations, replacing the second segment with the selected alternative translation in the presented translation text. The segmentation data received from the machine translation system includes a plurality of possible segmentations of the translated text. Receiving alternative translations for each segment of each of the plurality of possible segmentations of the translated text. Presenting a user interface feature allowing the user to set one of the plurality of possible segmentations to be the first segmentation. The user interface feature is a plurality of radio buttons or a slider having a plurality of positions. In response to a user selection of a fourth portion of translated text, presenting an input field to allow the user to enter a translation for the segment corresponding to the fourth portion of translated text. Receiving a user selection of a fifth portion of the translated text; and receiving one or more alternative translations for the fifth portion of the translated text from the machine translation system, wherein the operations further comprise presenting the one or more alternative translations for the fifth portion of the translated text in the user interface. Receiving data identifying a selected alternative translation from the user device; and making the selected alternative translation available to the machine translation system.

In general, another aspect of the subject matter described in this specification can be embodied in methods that include the actions of receiving data identifying source language text; receiving a translation for the source language text from a machine translation system, the translation including translated text corresponding to the source language text and segmentation data for the translated text, wherein the segmentation data includes a first segmentation of the translated text, the first segmentation dividing the translated text into two or more segments; receiving one or more alternative translations for each of the two or more segments from the machine translation system; sending the translated text to a user device for presentation in a user interface; receiving data identifying a first portion of the translated text from the user device; and sending the one or more alternative translations for a first segment of the translated text corresponding to the first portion to the user device for presentation in the user interface. Other embodiments of this aspect include corresponding systems, apparatus, and computer programs, configured to perform the actions of the methods, encoded on computer storage devices.

These and other embodiments can each optionally include one or more of the following features. Receiving data identifying a second portion of the translated text from the user device; and sending data identifying a second segment of the translated text corresponding to the second portion of the translated text according to the first segmentation to the user device. Receiving a translation further comprises receiving alignment data from the machine translation system that identifies portions of the source text that correspond to each of the two or more segments. Receiving data identifying a third portion of the translated text from the user device; and sending data identifying a portion of the source language text that corresponds to a third segment of the translated text to the user device, the third segment including the third portion of the translated text. Receiving data identifying a fourth portion of the translated text that does not correspond to any of the two or more segments associated with the first segmentation; receiving one or more alternative translations for the fourth portion of the translated text from the machine translation system; and sending the one or more alternative translations for the fourth portion to the user device for presentation in the user interface.

Particular embodiments of the subject matter described in this specification can be implemented so as to realize one or more of the following advantages. A user of a machine translation system can gain a greater understanding of how the translated text was generated and of the meaning of the translated text. Furthermore, the user is given an efficient way to correct the machine-generated translation. Additionally, user-corrected translations and user-generated translations can be made available to a machine translation system for use in improving the quality of machine-generated translations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
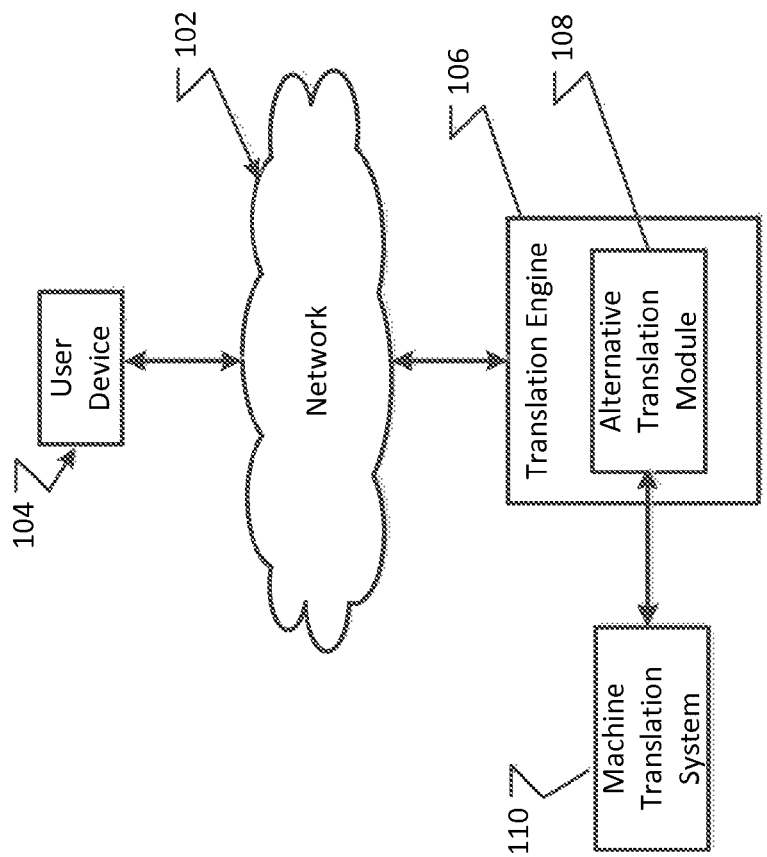
FIG. 1 is a block diagram of an example system in which machine translations are provided to user devices.

FIG. 1 is a block diagram of an example environment in which machine translations are provided to user devices. A computer network 102, such the Internet, or a combination of the Internet and one or more wired or wireless networks, connects a user device 104 and a translation engine 106.

The user device 104 is an electronic device that is under control of a user and is capable of sending and receiving data over the network 102. Example user devices 104 include personal computers, mobile communication devices, smart phones, and so on. A user device 104 typically includes a user application, such as a web browser or other communication software, to facilitate the sending and receiving of data over the network 102.

The translation engine 106 translates text from one natural language to another natural language. In some implementations, the translation system 106 can receive data identifying text that is to be translated as a direct input from a user. For example, the text can be received from the user through a translation user interface presented on the user device 102. In some implementations, the translation engine 106 supports multiple languages and receives, along with the data identifying the text to be translated, data identifying the source language of the text and a target language into which the text is to be translated. In some implementations, the translation engine 106 identifies the source language based on characteristics of the received text.

The translation engine 106 includes, or is in data communication with, a machine translation system 110. The machine translation system 110 receives data identifying text in a source language from the translation engine 106 or a user device 104 and translates the text into a desired target language to generate translated text. In some implementations, the machine translation system 110 is a statistical machine translation system that translates text using a statistical technique based on a particular translation model for translating text from one language to another. Translation models for different language combinations are generally used by a translation system to generate translations.

Figure 2:
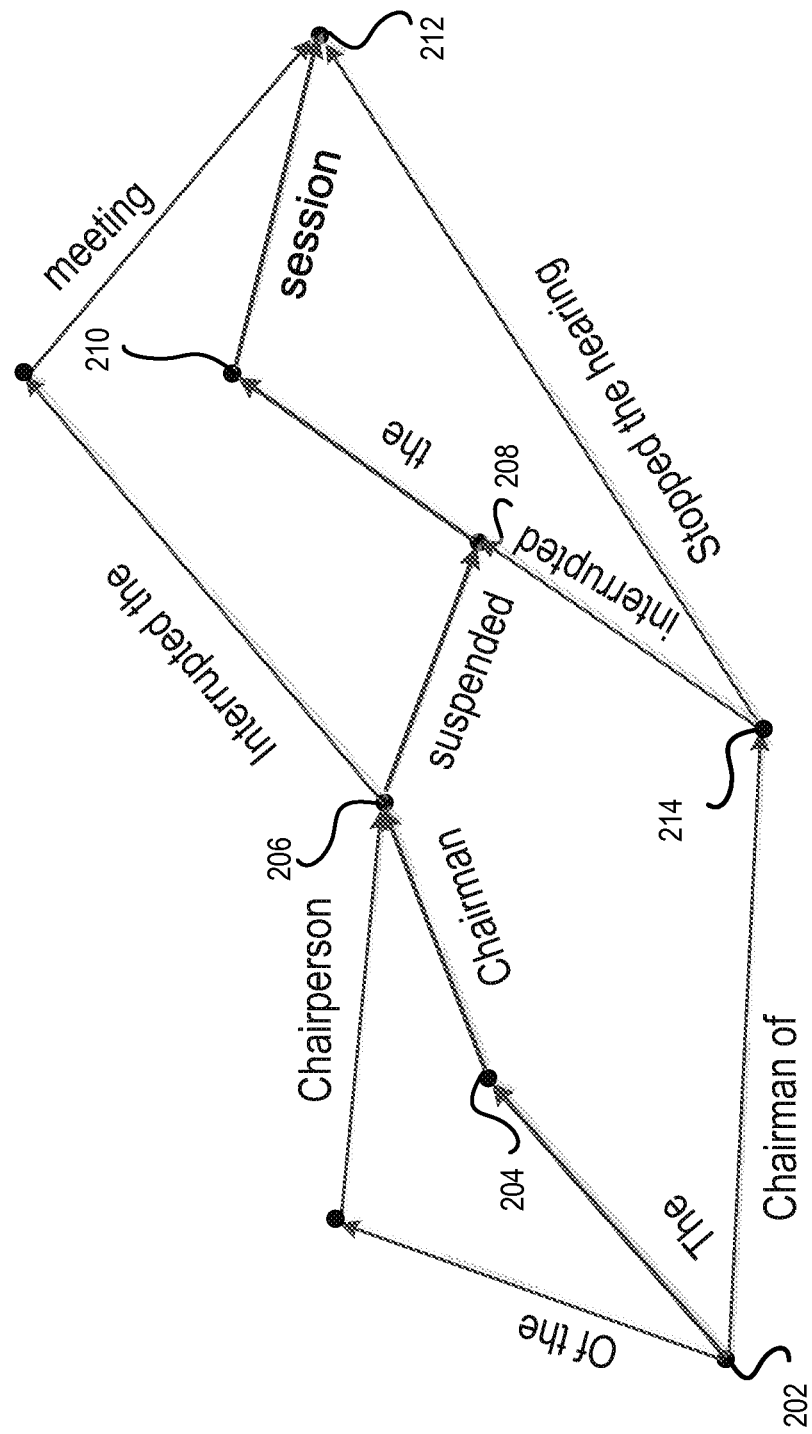
FIG. 2 illustrates an example directed acyclic graph of possible translations for example source language text.

FIG. 2 illustrates an example directed acyclic graph of possible translations for example source language text. In some implementations, the machine translation system 110 generates a graph, e.g., a lattice, of possible translations for the source language text. Each possible translation in the graph can be associated with a score based on a particular translation model. The machine translation system 110 can select the possible translation having the highest score as the translation for the source language text. The translations that the machine translation system 110 considered but did not select can include alternative translations for portions, e.g., characters, words, phrases, or sentences, of the source language text. Thus, because there can be many different ways of dividing a particular piece of text into portions, the possible translations can include translations that have different segmentations, e.g., that segment the translated text in different ways, that correspond to the different ways the source language text can be divided. Further, the machine translation system 110 can consider alternative translations for particular segments of the translated text.

For example, given the French text "Bonjour mes amis, comment allez-vous aujourd'hui?," the machine translation system 110 can select an English translation "Hello my friends, how are you today?" This result can correspond to a translation that segmented the translated text as [Hello] [my friends] [, how] [are you today] [?]. However, the machine translation system 110 could have considered alternative translations for, for example, the segment [Hello], such as "Hi" and "Greetings." Further, the machine translation 110 could have also considered translations that segmented portions of the translated text in different ways, such as [Hello] [my friends,] [how] [are you today?] and [Hello my friends,] [how are you today?], as well as alternative translations for each of those alternative segments.

Each directed edge in the graph shown in FIG. 2 can represent an English translation for a portion, e.g., a word, phrase, or sentence, of the German source language text "Der Vorsitzende unterbrach die Sitzung." Each path of directed edges that begins at the start node 202 and ends at the end node 212 is a possible translation for the entire example text. In the illustrated example, the machine translation system 110 has selected the translation that is identified by the edges between nodes 202, 204, 206, 208, 210, and 212, i.e., "The chairman suspended the session," as the translation for the example text. Some machine translation systems assign a translation score to each edge, i.e., to each translation of each portion of the source language text. As shown in the graph, multiple paths, i.e., translations, are considered by the machine translation system. For example, a possible translation, "Chairman of stopped the hearing," can be identified by the directed edges between nodes 202, 214, and 212. Each possible translation can have a different segmentation, with the segments corresponding to different combinations of tokens of the source language text.

In some circumstances, allowing a user to see the segments used by the machine translation system 110 to generate a translation can give the user useful information about how the translation was generated and the meaning of the translated text. Further, displaying alternative translations for the segments can allow a user to efficiently modify the translation generated by machine translation system 110.

The translation engine 106 can optionally include an alternative translation module 108. The alternative translation module 108 can interact with the user device 104 to display in a user interface on the user device alternative translations and other related information, e.g., possible segmentations of the translated text, that were generated by machine translation system 110 in the course of translating a particular source language text.

In response to receiving data identifying source language text that is to be translated into a target language, the alternative translation module 108 can request translated text corresponding to the source language text from the machine translation system 110. The alternative translation module 108 also requests segmentation data from the machine translation system 110. The segmentation data identifies a segmentation of the translated text that divides the text into multiple segments. The alternative translation module 108 also requests alignment data that specifies, for each segment, a corresponding portion of source language text, i.e., the portion of the source text the segment translates.

In addition to the requested translation and segmentation data, the alternative translation module 108 requests alternative translations for each segment of translated text from the machine translation system 110. In some cases, e.g., when the translated text is not segmented by the machine translation system 110 because it is too short, the alternative translation module 108 receives alternative translations for the entire translated text. When the alternative translation module 108 has received the translated text, it can send the translated text to the user device 104 for presentation in a user interface.

For user devices that support client-side executable instructions, when a translation that includes the additional data, i.e., segmentation data, alignment data, and alternative translation, has been received from the machine translation system 110, the alternative translation module 108 sends executable instructions to the user device 108. These executable instructions can be a client-side script that is executed by the web browser of the user device 108, such as JavaScript or VBScript code. Alternatively, the executable instructions can be client-executable Java or native client instructions executable on a native client platform on the user device. The instructions cause the user device to present the source language text and the translated text in a user interface. In some implementations, the user interface is a translation user interface used to input the source language text.

The client-side executable instructions provide user interface functionality that allows the user to interact with the source and target texts in one or more of the ways that are described below.

For example, the executable instructions can cause the user device 106 to respond to a user action identifying a portion of the translated text by highlighting the particular segment of the translated text to which the identified portion belongs. The user action can be mousing-over the portion of text, i.e., moving the cursor of a user interface device over the portion of displayed translated text on the user interface. Highlighting text on the user interface can be any one of displaying a box around the text in the user interface, changing the color of the text when it is displayed in the user interface, or changing the background of the text in the user interface, for example.

In addition to or instead of highlighting the segment of text, the instructions can cause the client device to highlight the portion of the displayed source language text that corresponds to the particular segment. The corresponding portion of source language text is the portion of source language text for which the identified segment is a translation. The corresponding portion can be identified by alignment data received from the machine translation system 110. In some implementations, the user device can highlight the segment in one manner and highlight the corresponding source language text in another manner, e.g., displaying the segment with a first background color and displaying the corresponding source text with a second background color.

Alternatively or additionally, the user device can respond to a user action identifying a portion of the source text by highlighting the segment of the displayed translated text that corresponds to the identified portion, based on the alignment data.

In another example, in response to the user selecting the portion of translated text, the instructions can cause the user device to display one or more alternative translations for the segment containing the translated text portion. The user selection can be a mouse click on the portion, activation of a keyboard key while a mouse cursor is hovered over the portion, dragging a cursor over the portion, and so on. The alternative suggestions can be displayed proximate to the selected portion of translated text in the user interface. Optionally, the alternative selections are displayed in an order according to their respective translation scores, e.g., the alternative selection with the highest score can be displayed at the top of a list of alternative translations ordered by their translation scores. The translation scores can be received by the alternative translation module 108 from the machine translation system 110 along with the alternative translations.

In response to the user selecting one of the displayed alternative translations, the instructions can cause the client device 106 to replace the segment with the alternative translation in the displayed translated text, allowing the user to view a desired translation rather than the machine-generated translation. Optionally, after a user selects an alternative translation, the instructions send data identifying the selected alternative translation to the translation engine 106. The translation engine 106 can receive the data and make it available to the machine translation system 110 for improving the quality of machine-generated translations, e.g., for use as training data or for refining translation scoring.

In some implementations, the instructions can cause the user device 106 to display an input field along with, e.g., directly above or below, the alternative translations to allow a user to input a translation if none of the displayed alternative translations are satisfactory to the user. Once a user has entered a translation into the input field, the instructions can cause the user device to replace the segment to which the displayed alternative translations correspond with the entered translation in the displayed translated text. The instructions may also cause the user device to send the instructions to the translation engine 106, where they can be made available to the machine translation system 110 for use as training data.

Under some circumstances, a user may desire an alternative translation for a phrase in the translated text that does not correspond to an existing segmentation. For example, in the example described above, where segmentation data indicates that the translated text is segmented as [Hello] [my friends] [, how] [are you today] [?], the user may desire an alternative translation for the phrase "how are you." In some implementations, in response to a user action selecting a portion of translated text that does not correspond to any segment identified by the segmentation data, the instructions cause the user device 106 to request alternative translations for the user-selected portion of translated text. The instructions send a request for translations to the translation engine 106, which then obtain the translations from the machine translation system 110. Upon receiving the requested alternative translations, the instructions can cause the user device 106 to display the alternative translations in the user interface as described above.

If the alternative translation module 108 receives multiple possible segmentations for the translated text from the machine translation system 110, the instructions sent to the user device 110 can cause the device to present a user interface feature that allows a user to select between the possible segmentations. The user interface feature may be a slider with multiple possible positions with each position corresponding to a possible segmentation or multiple radio buttons with each radio button corresponding to one of the possible segmentations. Alternatively, the user can indicate a preference for one of the segmentations by, for example, activating a certain keyboard key that corresponds to one of the possible segmentations while mousing-over the translated text. When a user selection of one of the segments is received, e.g., when a user selects a radio button or moves a slider to a certain position, the instructions can cause the user device to indicate the selected segmentation in the displayed translated text. For example, the user device can highlight each segment of the translated text individually. Once a segmentation has been selected, the instructions can allow the user to interact with the source and target texts in one or more of the ways that are described above.

In some implementations, the alternative translations module 106 can process information received from the machine translation system 110 before sending it to the client device 106. For example, in order to ensure that replacing a segment of translated text with an alternative translation does not alter the spacing or punctuation of the displayed translated text in an incorrect or undesirable way, the alternative translation system may include data with each alternative translation that indicates if the translation has a preceding space, attaches to the next character, requires an appended punctuation mark, and so on. The instructions can then cause the client device to, when an alternative translation is selected, insert or remove spaces, punctuation marks, and so on in the displayed text as indicated by the additional data.

Alternative implementations of the user interaction functionality described above are possible. For example, to accommodate user devices that do not support client-side scripting, the alternative translation module 108 can send an HTML page to the user device that includes the source language text and the translated text. The HTML page can define user actions, e.g., mouse-overs, and identify each portion of the presented translated text as a hyperlink. In response to a user mousing-over or selecting a portion of translated text, for example, a hyperlink can be activated that sends a request to the translation engine 106 for a corresponding segment or portion of source text, or for alternative translations.

Figure 3:
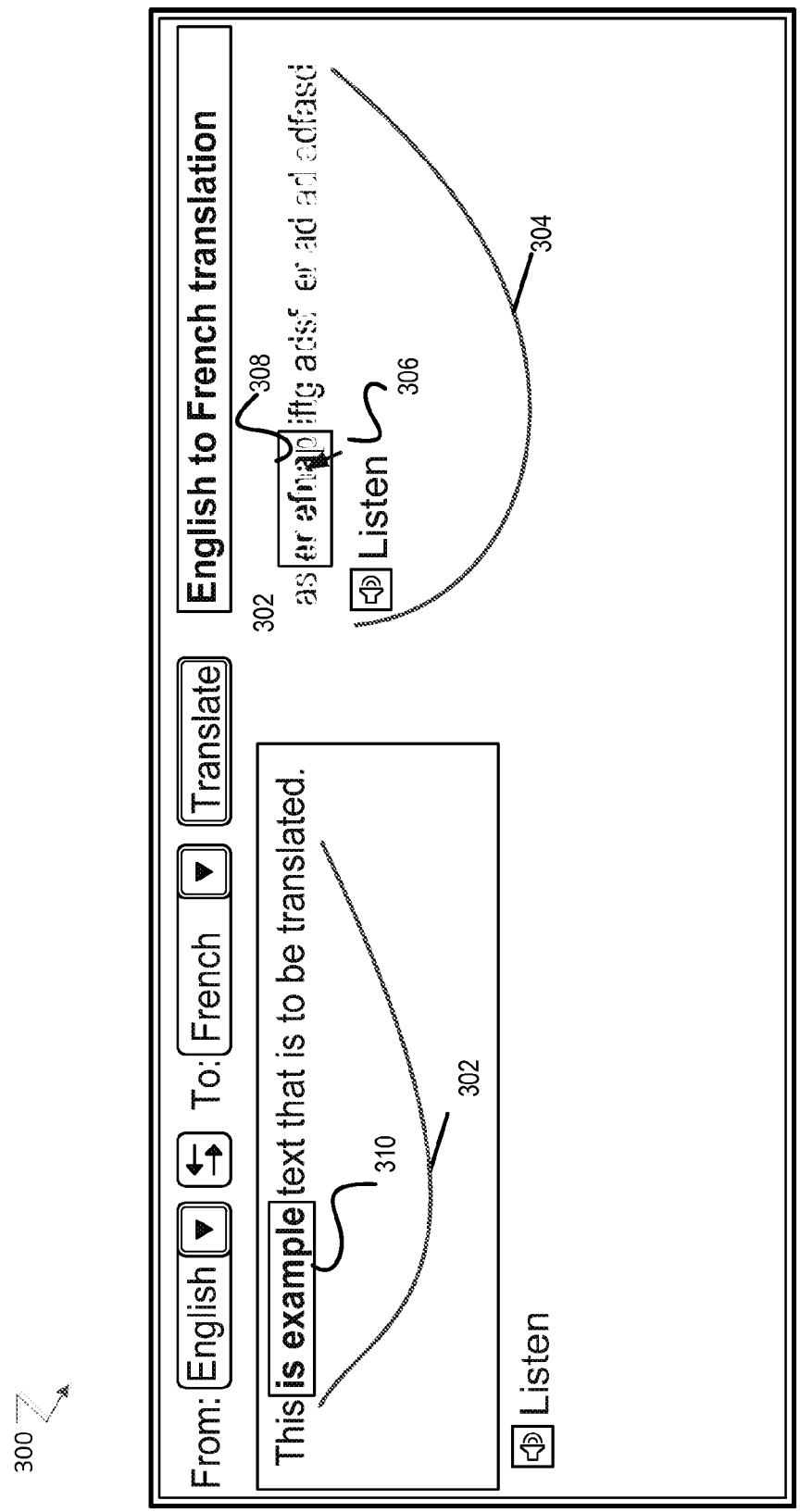
FIG. 3 illustrates an example translation user interface where source language text and machine-generated translated text are presented to a user.

FIG. 3 illustrates an example translation user interface 300 where source language text 302 and machine-generated translated text 304 are presented to a user. In response to a user mousing-over a portion of the translated text with a cursor 306, the user device highlights the segment containing the portion of translated text as described above. In the illustrated example, the user device highlights the segment by displaying a box 308 around the segment. Alternatively, the user device can change the color of the segment text, change the background color of the segment, and so on. The user device also highlights, i.e., displays a box 310 around, the portion of source text corresponding to the segment in response to the user mouse-over.

Figure 4A:
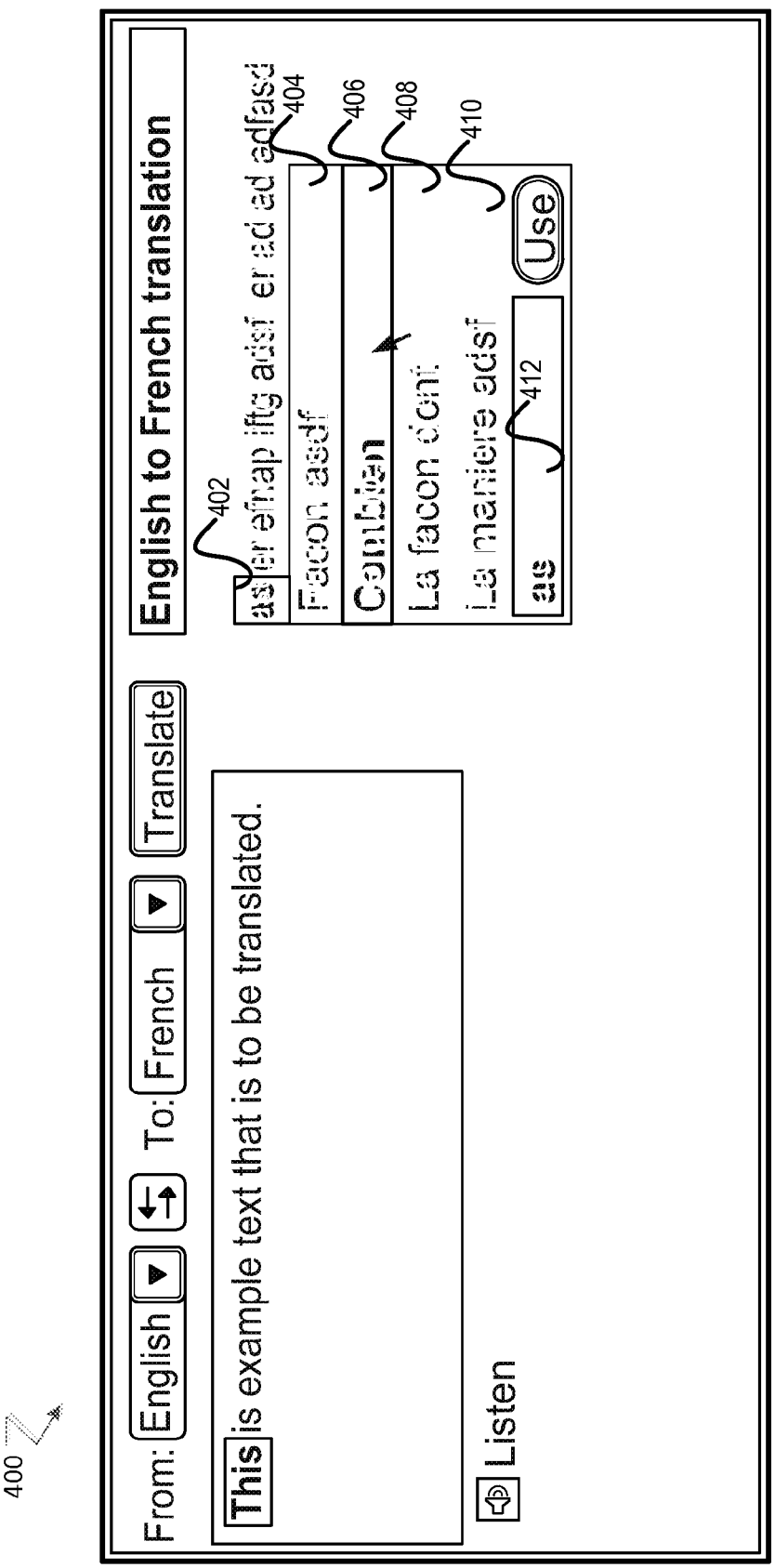
FIG. 4A illustrates an example translation interface where alternative translations for a word in the translated text are presented to a user.

FIG. 4A illustrates an example translation interface 400 where alternative translations for a word in the translated text are presented to a user. In FIG. 4A, a user has selected a portion of translated text that is included in the segment 402. In response to the user selection, the user device has presented alternative translations 404, 406, 408, and 410 of the segment 402 according to the above description. The user device has also highlighted a corresponding portion 404 of the source text. The alternative translations are presented in an order according to a translation score for each alternative translation as described above. Alternative translation 404 can have a higher score than alternative translation 406, which has a higher score than alternative translation 408, and so on. In some implementations, in response to a user selection of any of the alternative translations, the user device can replace the segment 402 with the selected alternative translation in the displayed translated text. An input field 412 is also presented to allow the user to input an alternative translation not included in the displayed alternative translations.

Figure 4B:
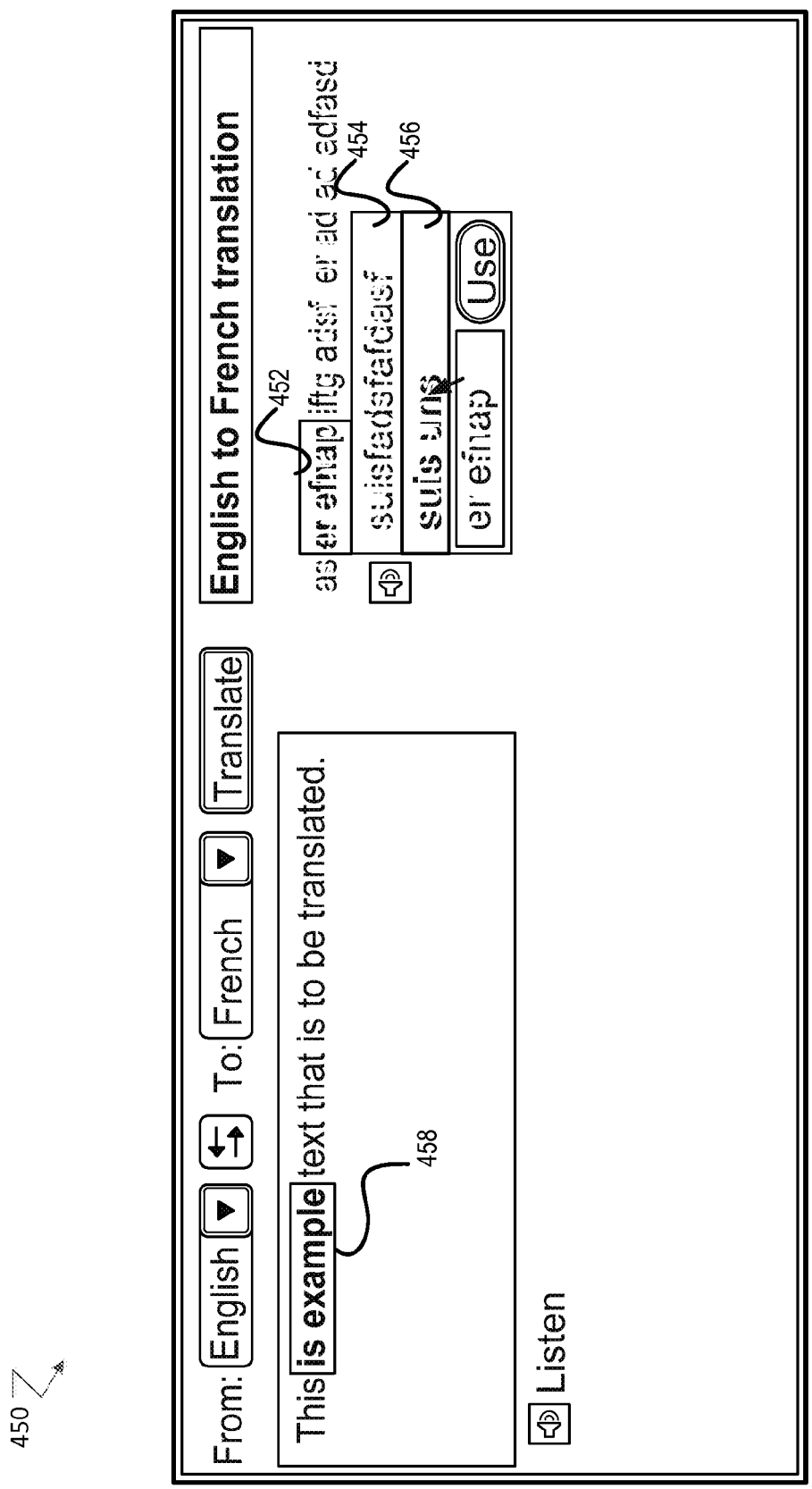
FIG. 4B illustrates an example translation interface where alternative translations for a phrase in the translated text are presented to a user.

FIG. 4B illustrates an example translation interface 450 where alternative translations for a phrase in the translated text are presented. In FIG. 4B, a user has selected a portion of translated text that is included in segment 452. Segment 452 is a phrase, i.e., more than one word, of the translated text. In response to the user selection, the user device has presented alternative suggestions 454 and 456 for the segment 452. The user device has also highlighted, i.e, by displaying a box 458 around, a portion of the source text that corresponds to segment 452.

Figure 4C:
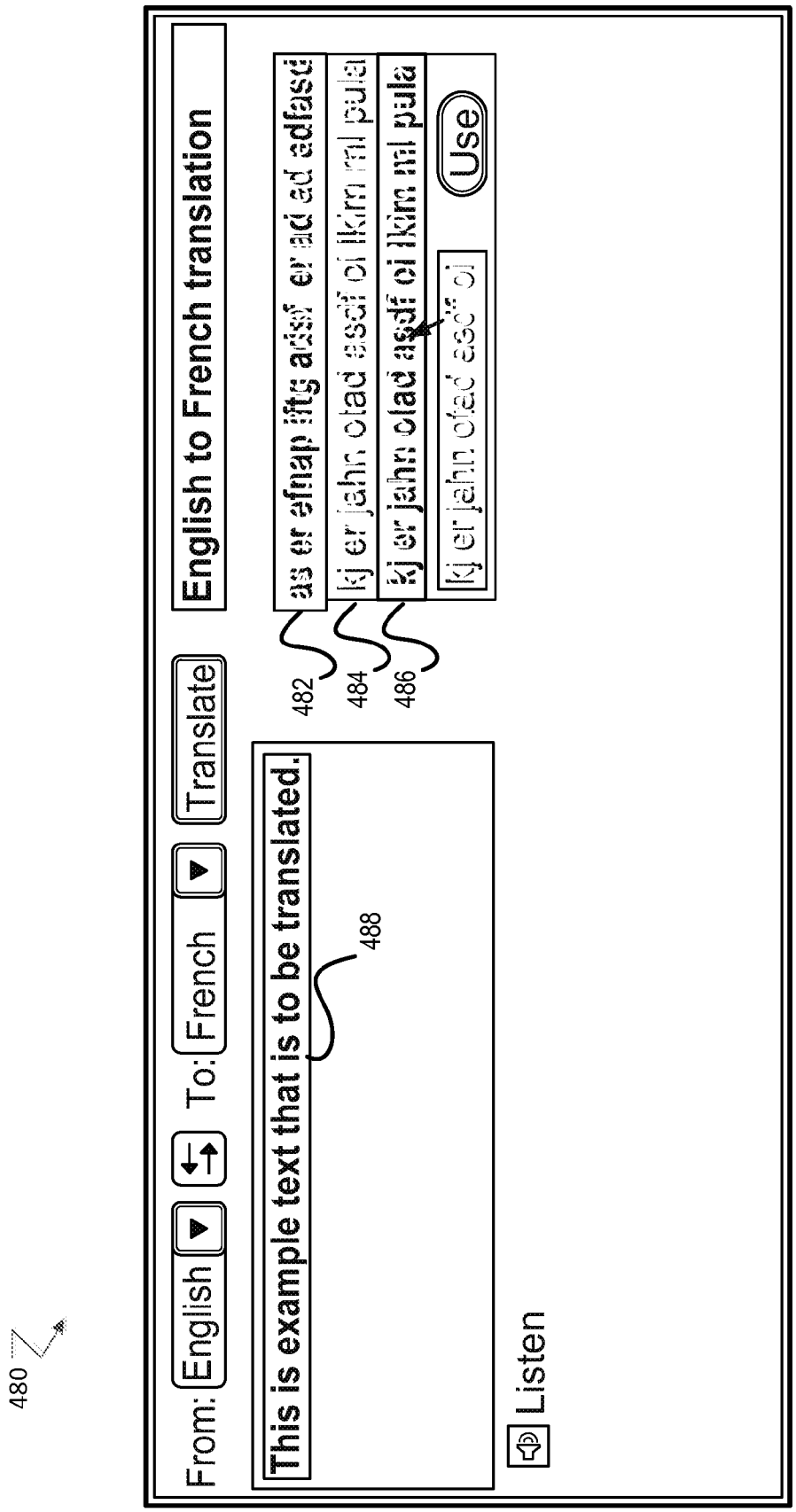
FIG. 4C illustrates an example translation interface where alternative translations for a sentence in the translated text are presented to a user.

FIG. 4C illustrates an example translation interface 480 where alternative translations for a sentence in the translated text are presented. In FIG. 4C, a user has selected a portion of translated text. In the illustrated example, in response to the user selection, the user device has presented alternative translations 484 and 486 for the entire translated text 482 and highlighted the entire source text 488. In some implementations, in the case of source text that contains more than one sentence, the segmentation data can indicate that each sentence of the translated text constitutes a separate segment of the translated text. In this case, in response to a user selection of a portion of a sentence in the translated text, the user device can display alternative translations for only the selected sentence.

Figure 5A:
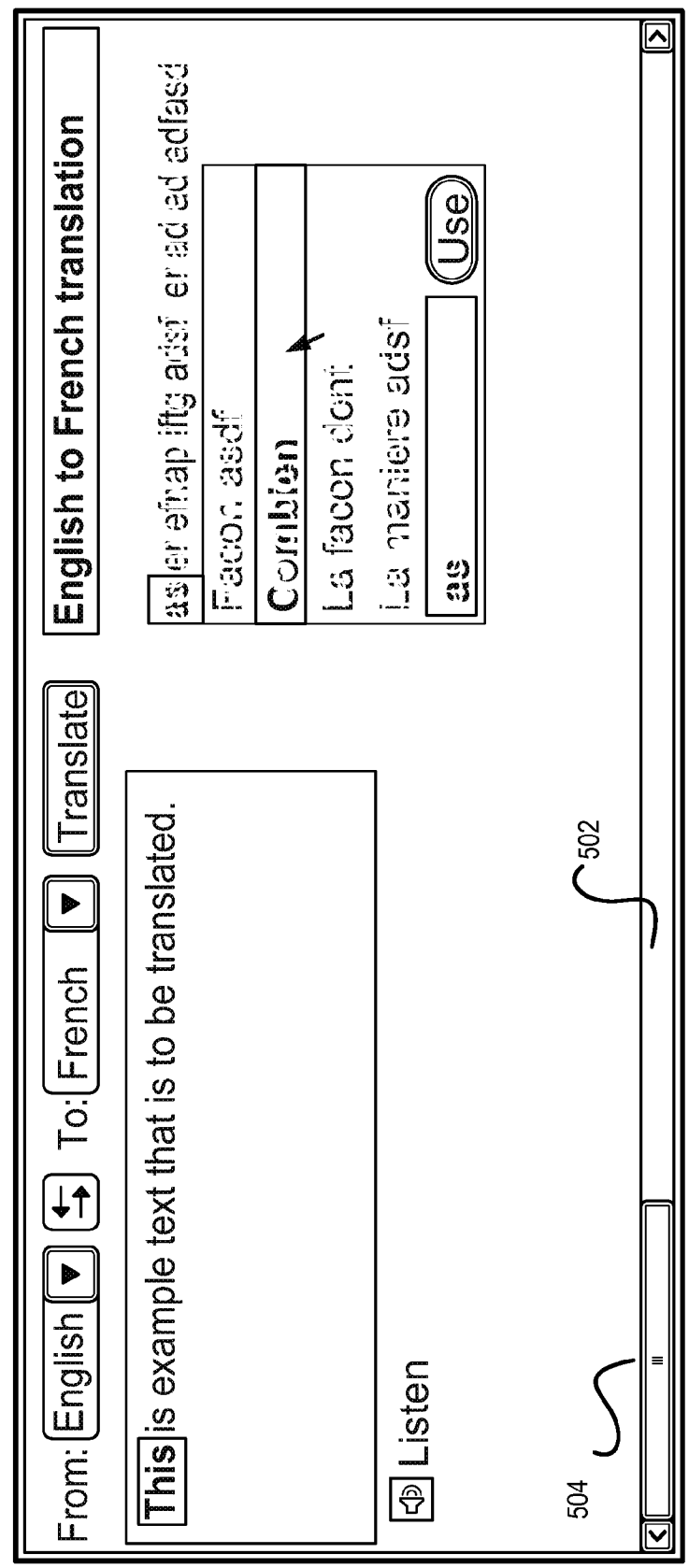
FIG. 5A illustrates an example translation interface where a shortest possible segmentation of translated text is selected.

FIG. 5A illustrates an example translation interface 500 where a shortest possible segmentation of translated text is selected. In FIG. 5A, multiple possible segmentations have been received as described above. The user device has presented a user interface feature, i.e., slider 502, to allow a user to select from the possible segmentations. In the illustrated example, a user has moved the slide bar to position 504. Alternatively, this can be the default position of the slide bar when the user interface feature is initially displayed. Position 504 can correspond to the shortest of the received possible segmentations, i.e., the segmentation dividing the translated text into the most segments. In some implementations, in response to a user selection of one the possible segmentations, i.e., by moving the slide bar, the user device can indicate the selected segmentation by highlighting it in the user interface for a specified amount of time or until the user moves the cursor off of the slide bar. For example, the user device can display a box around each segment of the segmentation, change the font color of each segment, or change the background color of each segment. After the segmentation has been selected, the user device can present alternative translations in response to user selections of portions of translated text as described above in conjunction with FIG. 4A.

Figure 5B:
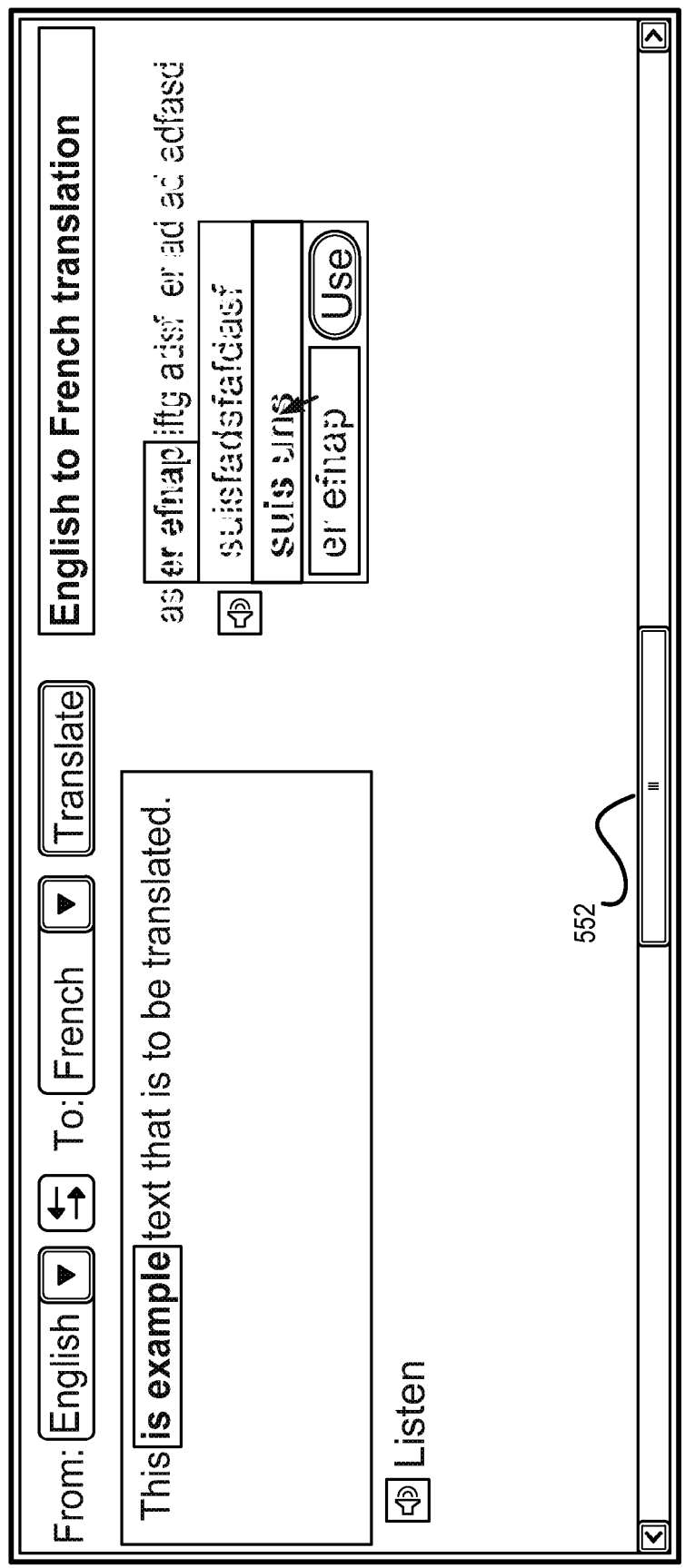
FIG. 5B illustrates an example translation interface where a phrase-level segmentation of translated text is selected.

FIG. 5B illustrates an example translation interface 550 where a phrase-level segmentation of translated text is selected. In FIG. 5B, the user has moved the slide bar to position 552 to select a phrase-level segmentation, i.e., one of the received possible segmentations that segments the translated text into multiple phrases, of the translated text. The user can then interact with the translated text as described above in conjunction with FIG. 4B.

Figure 5C:
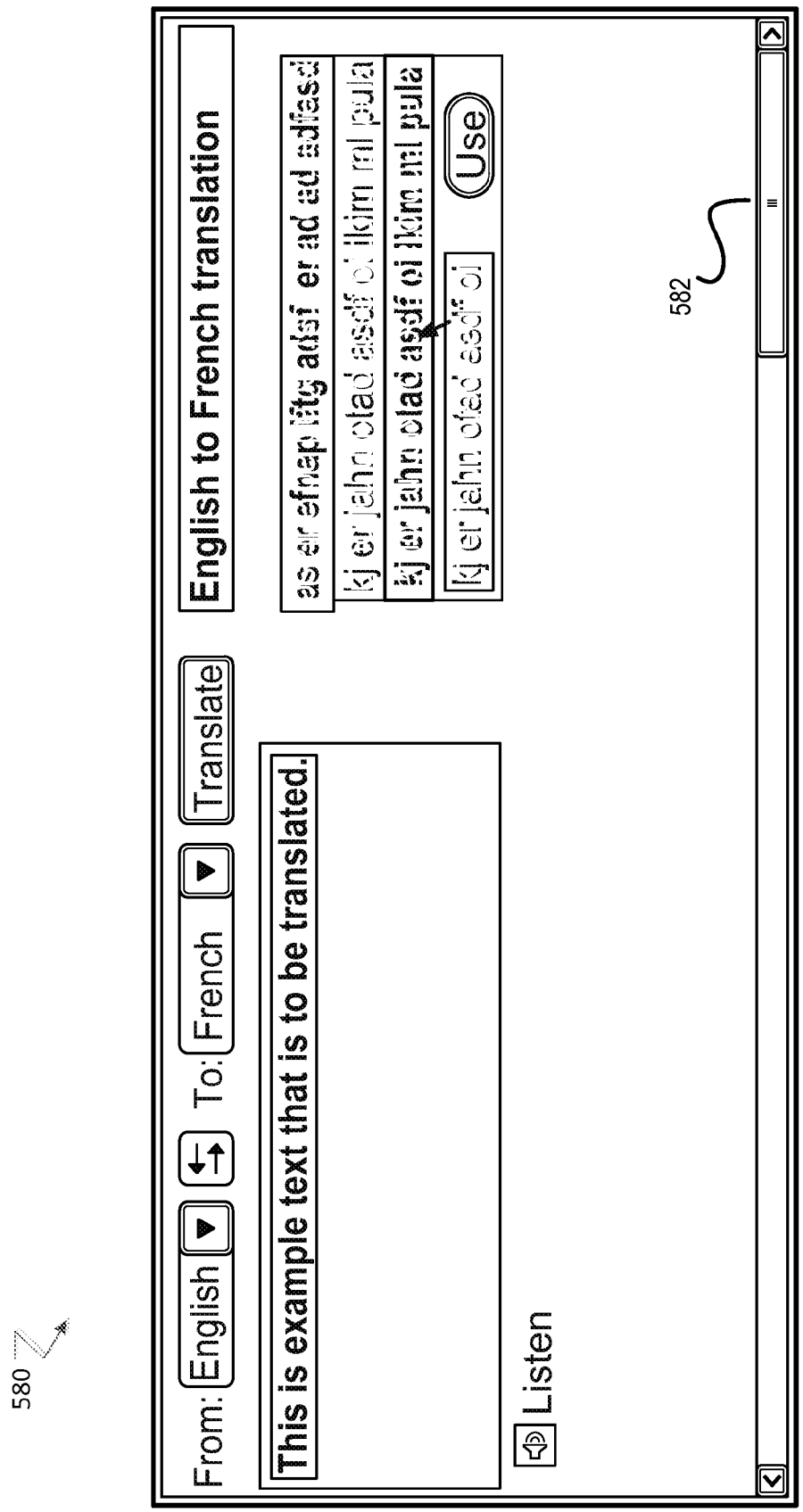
FIG. 5C illustrates an example translation interface where a longest possible segmentation of translated text is selected.

FIG. 5C illustrates an example translation interface 580 where a longest possible segmentation of translated text is selected. In FIG. 5C, the user has moved the slide bar to position 582 to select a longest, i.e., sentence-level, segmentation. The user can then interact with the translated text as described above in conjunction with FIG. 4C.

Figure 6:
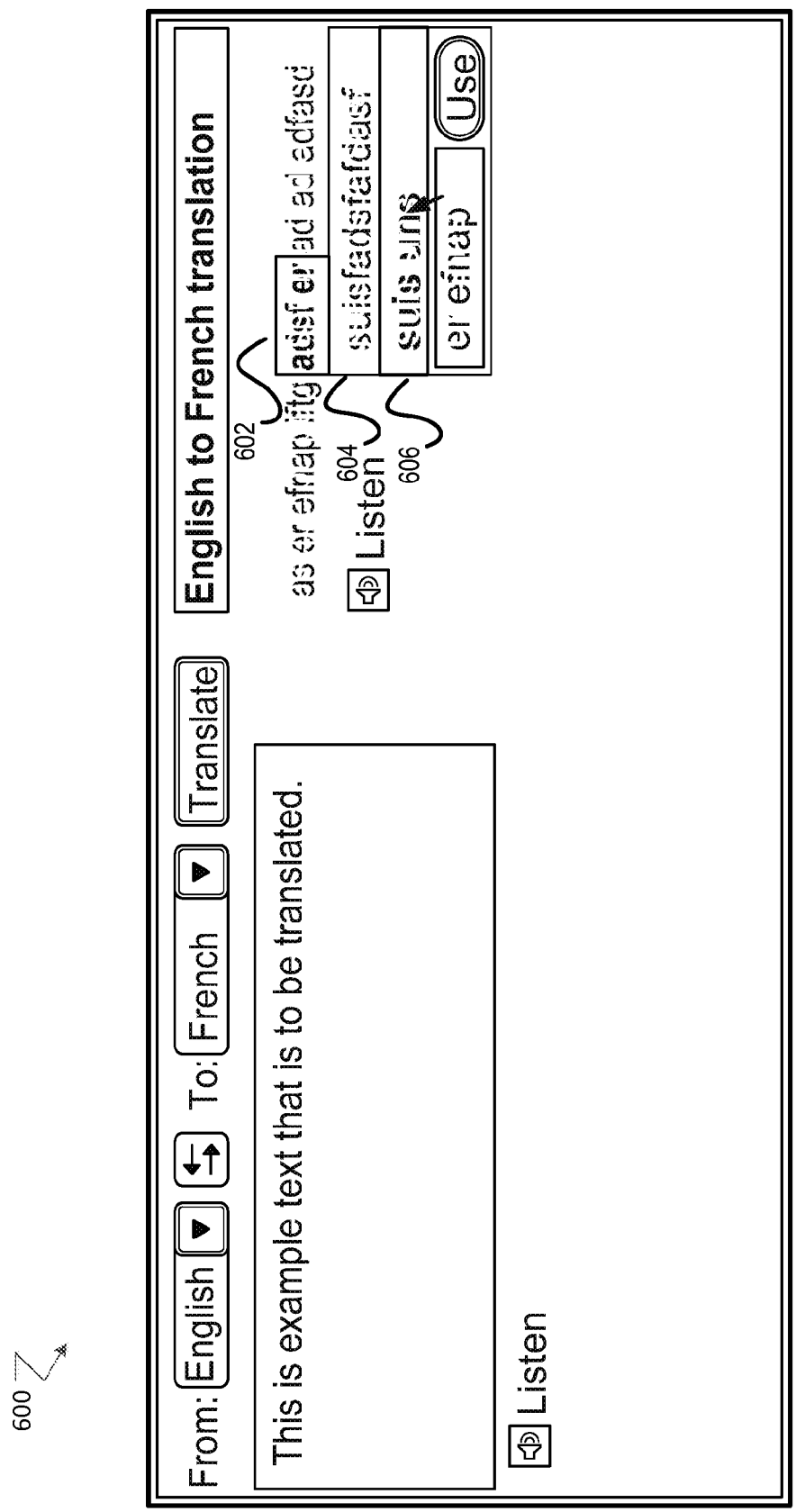
FIG. 6 illustrates an example translation interface where alternative translations for a user-specified portion of the translated text are provided to a user.

FIG. 6 illustrates an example translation interface 600 where alternative translations for a user-specified portion of the translated text are provided. In FIG. 6, the user has selected, e.g., by clicking and dragging with a mouse or by activating a keyboard key while mousing-over, a portion of the translated text 602 that does not correspond to any of the segments identified by a received segmentation. For example, the phrase selected by the user may contain portions of text that are part of a first segment of the segmentation and portions of text that are part of a second segment of the segmentation. In response to the user selection, the user device has presented alternative translations 604 and 606 for the user-specified portions of text. The alternative translations 604 and 606 are generated and presented according to the above description.

Figure 7:
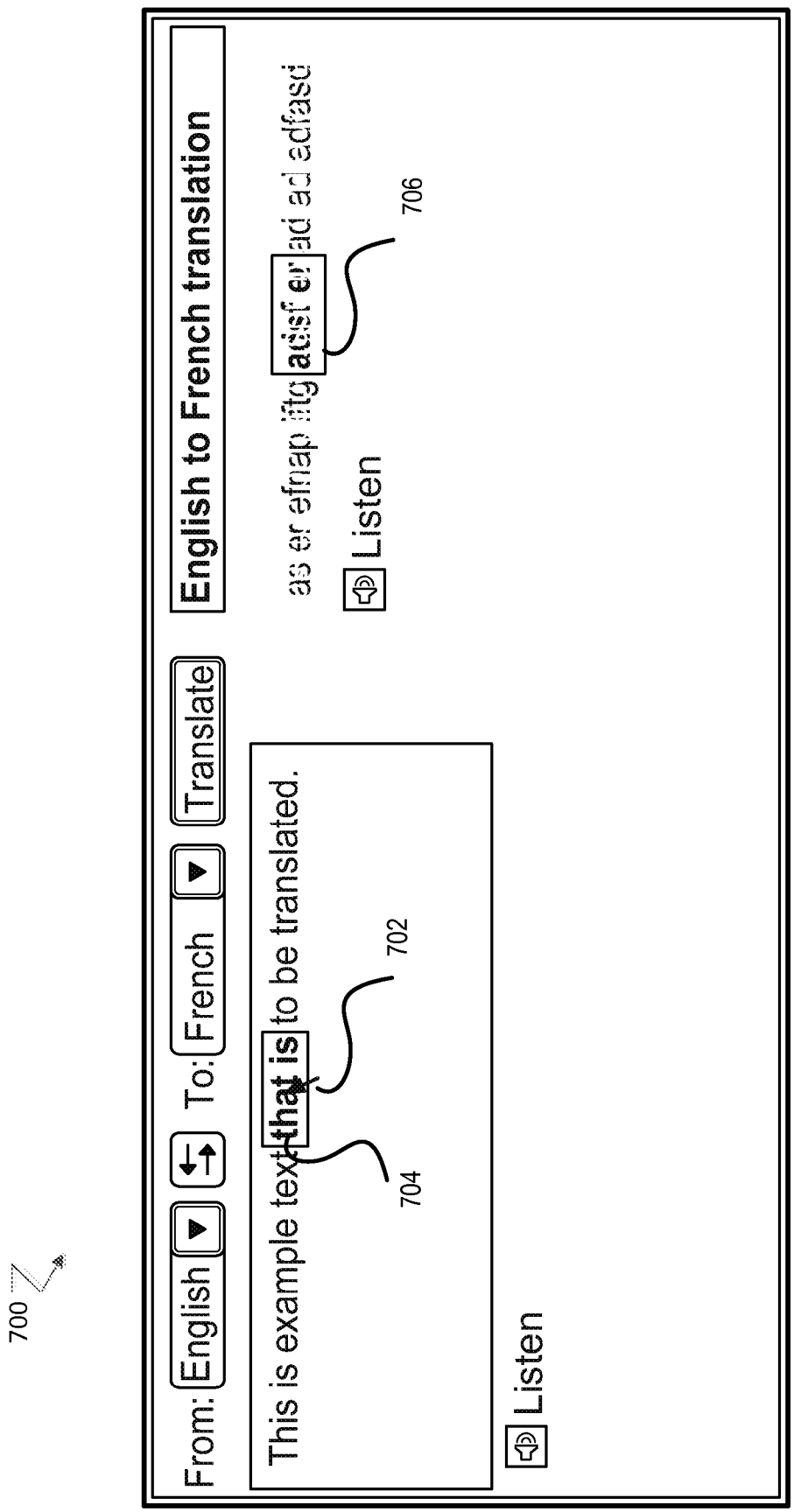
FIG. 7 illustrates an example translation interface where a segment of the translated text is highlighted.

FIG. 7 illustrates an example translation interface where a segment of the translated text is highlighted. In FIG. 7, a user has moused-over a portion 704 of source text with the cursor 702. In response to the user action, the user device has highlighted the segment 706 of the translated text that corresponds to (i.e., is a translation of) the portion 704 of the source text. The user device can identify the segment 706 that is to be highlighted according to the description above.

Figure 8:
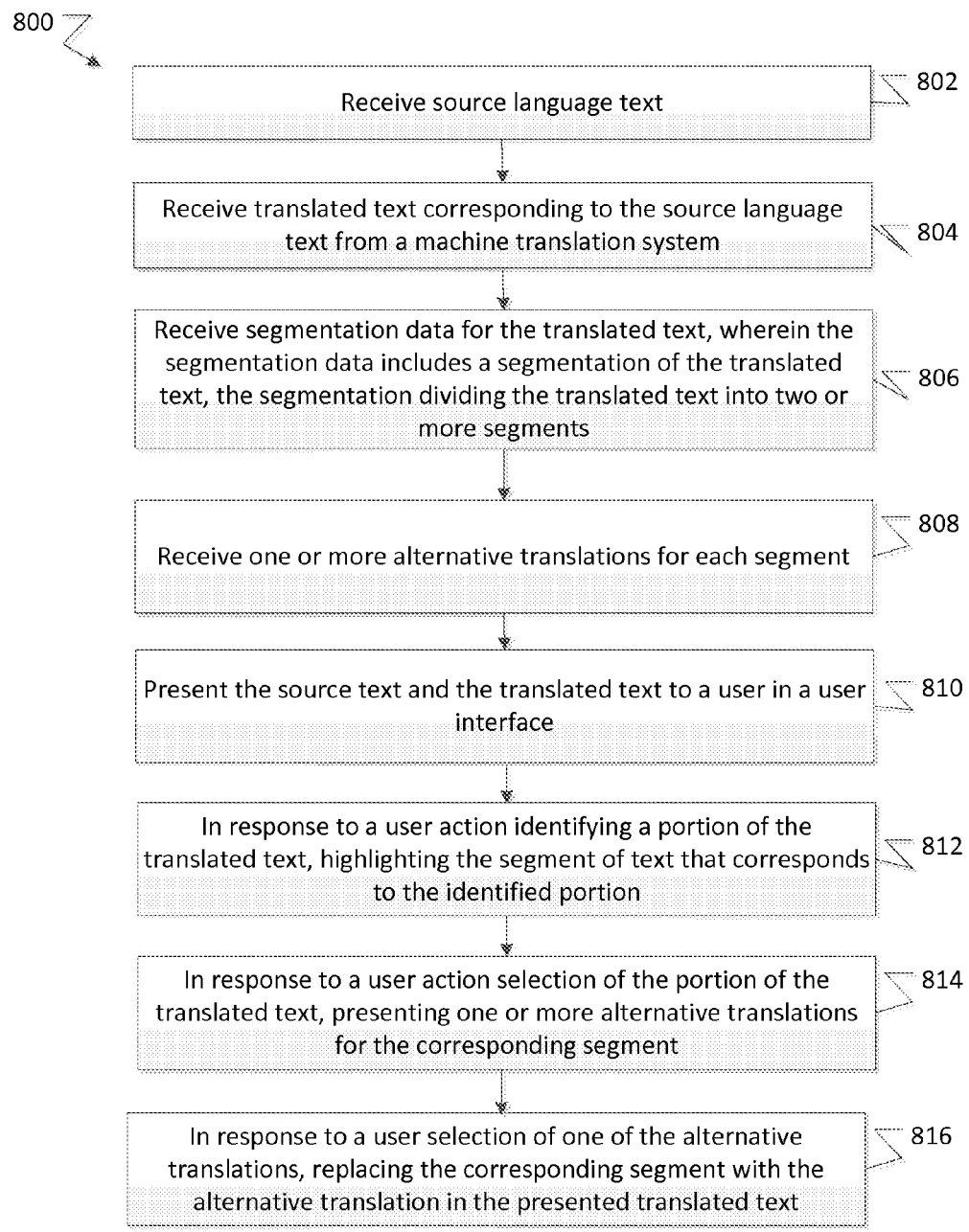
FIG. 8 is a flow diagram of an example process for presenting alternative translations on a user device.

FIG. 8 is a flow diagram of an example process 800 for presenting alternative translations on a user device. In some implementations, client-side code on user device 104 can be used to perform the process 800.

The user device 104 receives source language text (802). The user device 104 receives translated text corresponding to the source language text from a machine translation system (804). The user device 104 receives segmentation data for the translated text; the segmentation data defines a segmentation that divides the translated text into two or more segments (806). The user device 104 receives one or more alternative translations for each segment (808). The user device 104 presents the source text and the translated text to a user in a user interface (810). In response to a user action identifying a portion of the translated text, the user device 104 highlights the segment of the translated text that corresponds to the identified portion (812). In response to a user selection of the translated text, the user device 104 presents one or more of the alternative translations for the corresponding segment (814). In response to a user selection of one of the alternative translations, the user device 104 replaces the corresponding segment with the alternative translation in the presented translated text (816).

Figure 9:
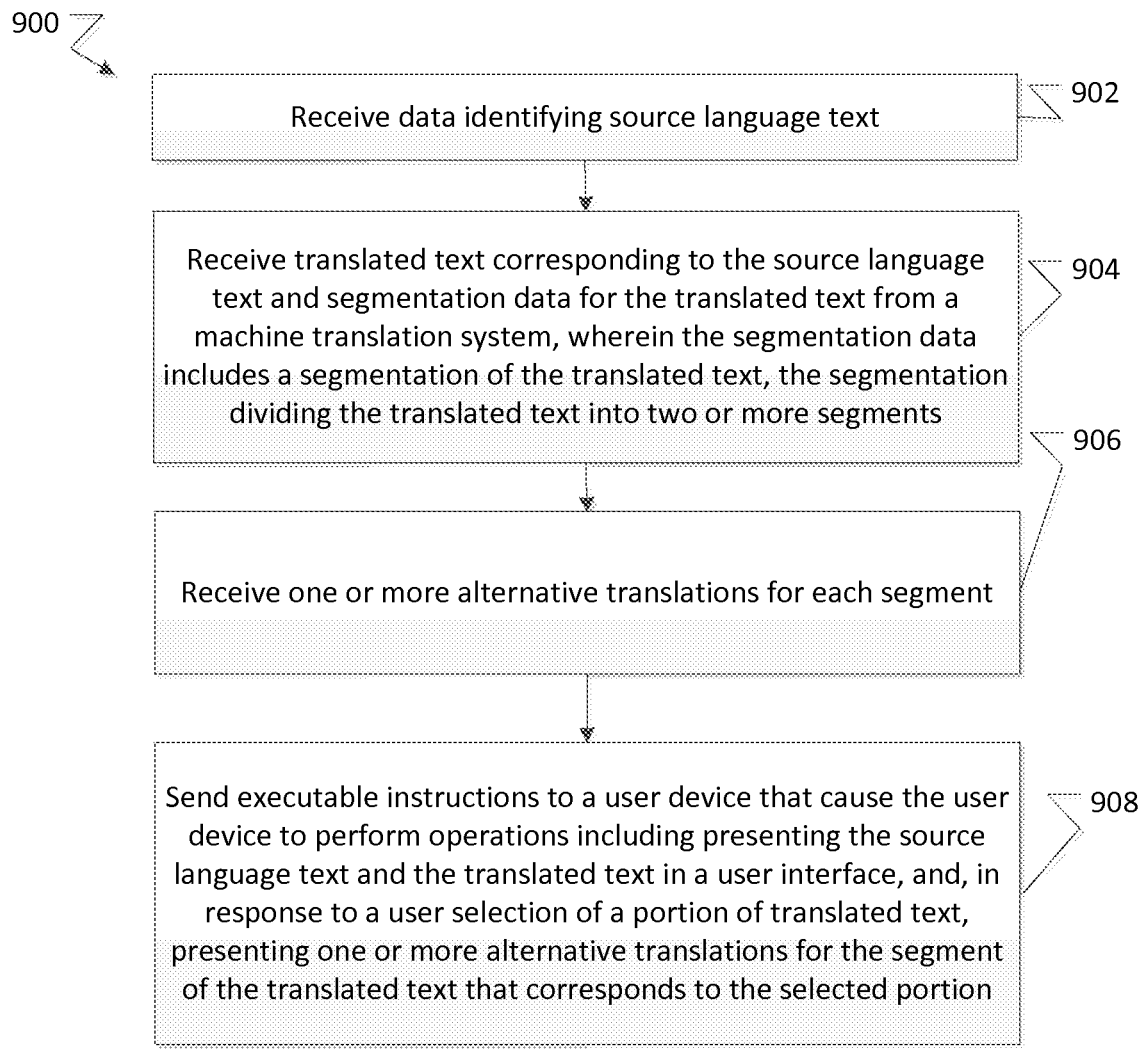
FIG. 9 is a flow diagram of an example process for providing alternative translations for presentation on a user device.

FIG. 9 is a flow diagram of an example process 900 for providing alternative translations for presentation on a user device. In general, the process 900 can be performed by a system including one or more computers programmed to perform the operations of the process. In some implementations, the translation engine 106 performs the process 900, as will be described.

The translation engine 106 receives data identifying source language text (902). The translation engine 106 receives translated text corresponding to the source language text and segmentation data for the translated text from a machine translation system; the segmentation data includes a segmentation of the translated text that divides the translated text into two or more segments (904). The translation engine 106 receives one or more alternative translations for each segment (906). The translation engine 108 sends executable instructions to a user device that cause the user device to perform operations including presenting the source language text and the translated text in a user interface, and, in response to a user selection of a portion of translated text, presenting one or more alternative translations for the segment of the translated text that corresponds to the selected portion (908).

Figure 10:
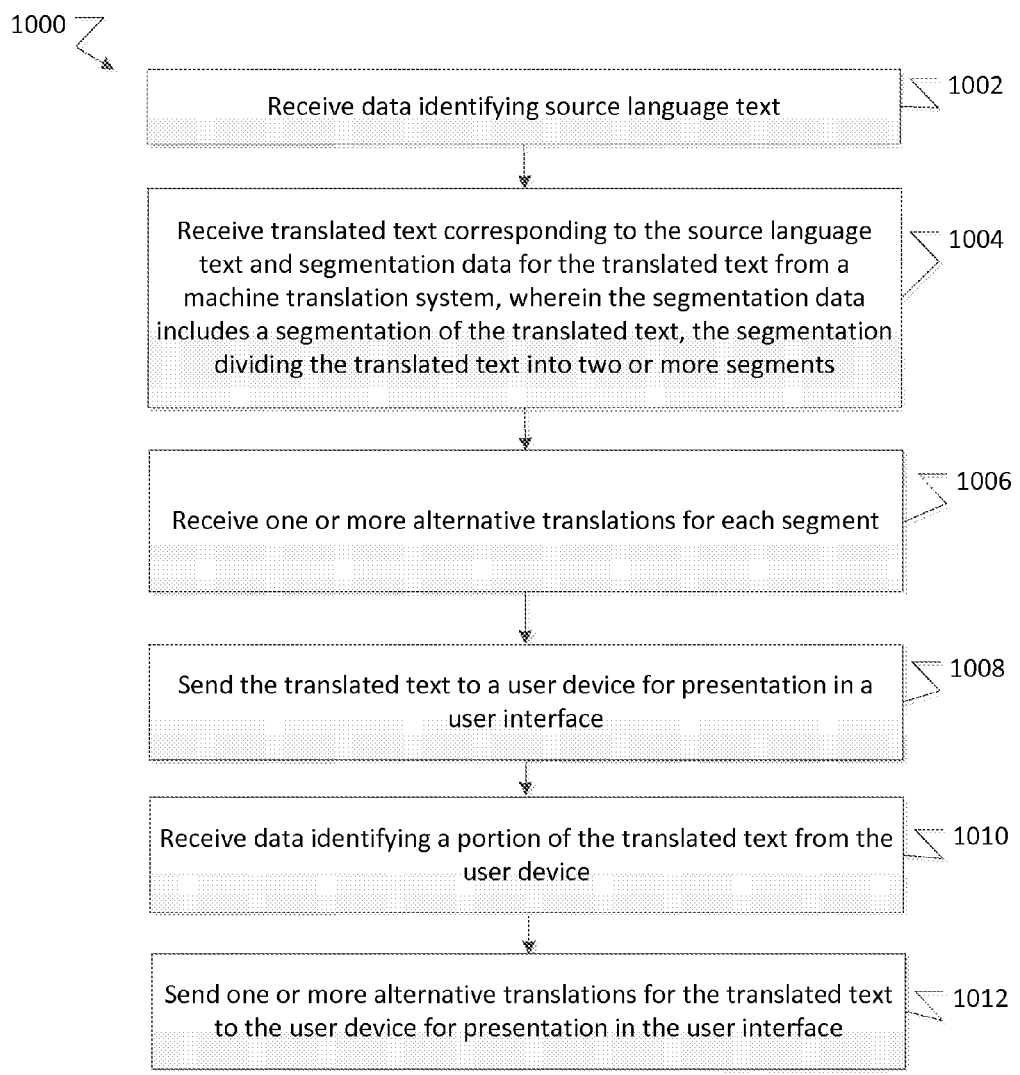
FIG. 10 is a flow diagram of an example process for providing alternative translations for presentation on a user device that does not support client-side scripting.

FIG. 10 is a flow diagram of an example process 1000 for providing alternative translations for presentation on a user device that does not support client-side scripting. In general, the process 1000 can be performed by a system including one or more computers programmed to perform the operations of the process. In some implementations, the translation engine 106 performs the process 1000, as will be described.

The translation engine 106 receives data identifying source language text (1002). The translation engine 106 receives translated text corresponding to the source language text and segmentation data for the translated text from a machine translation system, wherein the segmentation data includes a segmentation of the translated text and the segmentation divides the translated text into two or more segments (10004). The translation engine 106 receives one or more alternative translations for each segment (1006). The translation sends the translated text to a user device for presentation in a user interface (1008). The translation engine 106 receives data identifying a portion of the translated text from the user device (1010). The translation engine 106 sends one or more alternative translations for the translated text to the user device for presentation in the user interface (1012).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As an alternative to the attached claims and the embodiments described in the above description, the present invention could also be described by one of the following embodiments:

Embodiment 1 is directed to a method performed by a data processing apparatus, the method comprising: receiving source language text; receiving translated text corresponding to the source language text from a machine translation system; receiving segmentation data for the translated text, wherein the segmentation data includes a first segmentation of the translated text, the first segmentation dividing the translated text into two or more segments; and presenting the source text and the translated text to a user in a user interface.

Embodiment 2 is related to the method of embodiment 1, wherein the machine translation system is a statistical machine translation system.

Embodiment 3 is related to the method of embodiment 1 or 2, further comprising: in response to a user action identifying a first portion of the translated text, highlighting, in the user interface, a first segment of the translated text to which the first portion of the translated text corresponds according to the first segmentation.

Embodiment 4 is related to the method of embodiment 3, wherein highlighting the first segment includes any one of displaying a box around the first segment, changing the color of the text of the first segment, or changing a background color of the first segment.

Embodiment 5 is related to the method of any one of embodiments 1 through 4, further comprising: receiving one or more alternative translations for each of the two or more segments.

Embodiment 6 is related to the method of embodiment 5, further comprising: in response to a user selection of a second portion of the translated text, displaying, in the user interface, one or more alternative translations for a second segment to which the second portion of translated text corresponds according to the first segmentation.

Embodiment 7 is related to the method of embodiment 6, further comprising: in response to a user selection of an alternative translation, replacing the second segment with the selected alternative translation in the presented translated text.

Embodiment 8 is related to the method of embodiments 6 or 7, wherein each alternative translation is associated with a respective translation score, the method further comprising displaying alternative translations in an order based on the respective translation scores.

Embodiment 9 is related to the method of embodiments 7 or 8, further comprising: transmitting to a translation server data identifying the selected alternative translation.

Embodiment 10 is related to the method of any one of embodiments 1 through 9, wherein the segmentation data includes a plurality of possible segmentations of the translated text.

Embodiment 11 is related to the method of embodiment 10, further comprising: presenting a user interface feature allowing the user to select one of the plurality of possible segmentations.

Embodiment 12 is related to the method of embodiment 11, wherein the user interface feature is a plurality of radio buttons or a slider having a plurality of positions.

Embodiment 13 is related to the method of embodiment 12, further comprising: in response to a user input selecting one of the plurality of possible segmentations, indicating the selected possible segmentation in the presented translated text.

Embodiment 14 is related to the method of embodiment 13 further comprising: setting the selected possible segmentation to be the first segmentation.

Embodiment 15 is related to the method of any one of embodiments 1 through 9, further comprising: receiving alignment data identifying portions of the source text that correspond to each segment of the first segmentation.

Embodiment 16 is related to the method of any one of embodiments 10 through 14, further comprising: receiving alignment data identifying portions of the source text that correspond to each segment of each received segmentation.

Embodiment 17 is related to the method of embodiment 15 or 16 further comprising: in response to a user interaction with a fourth portion of the translated text, highlighting a portion of the source text that corresponds to a fourth segment of the translated text based on the alignment data, the fourth segment including the fourth portion of the translated text.

Embodiment 18 is related to the method of any one of embodiments 15, 16 or 17, further comprising: in response to a user action identifying a portion of the source text, highlighting a corresponding segment of the translated text based on the alignment data.

Embodiment 19 is related to the method of any one of embodiments 1 through 18, further comprising: in response to a user selection of a third portion of translated text that does not correspond to any of the two or more segments associated with the first segmentation, requesting one or more alternative translations for the third portion of translated text from the translation system; and displaying the one or more alternative translations for the third portion of translated text in the user interface.

Embodiment 20 is related to the method of embodiment 19, further comprising: in response to a user selection of one of the alternative translations for the third portion of translated text, replacing the third portion of translated text with the selected alternative translation in the presented translated text.

Embodiment 21 is related to the method of any one of embodiments 6 through 20, further comprising: in response to a user selection of a fifth portion of translated text, presenting an input field to allow the user to enter a translation for the segment corresponding to the fifth portion of translated text.

Embodiment 22 is related to the method of embodiment 21, further comprising: replacing the segment corresponding to the fifth portion of translated text with the entered translation in the presented translated text.

Embodiment 23 is related to the method of embodiment 21 or 22, further comprising: transmitting to a translation server data identifying the entered alternative translation.

Embodiment 24 is directed to a method performed by a data processing apparatus, the method comprising: receiving data identifying source language text; receiving a translation for the source language text from a machine translation system, the translation including translated text corresponding to the source language text and segmentation data for the translated text, wherein the segmentation data includes a first segmentation of the translated text, the first segmentation dividing the translated text into two or more segments; and sending executable instructions that, when executed by the user device, cause the user device to perform operations comprising presenting the source language text and the translated text in a user interface.

Embodiment 25 is related to the method of embodiment 24, wherein the data identifying source language text is received from the user device.

Embodiment 26 is related to the method of embodiments 24 or 25, wherein the executable instructions are a client-side script, client-executable Java, or native client instructions executable on a native client.

Embodiment 27 is related to the method of any one of embodiments 24 through 26, wherein the machine translation system is a statistical machine translation system.

Embodiment 28 is related to the method of embodiments of any one of embodiments 24 through 27, wherein the first segmentation is identified by the machine translation system as having a maximum number of segments.

Embodiment 29 is related to the method of any one of embodiments 24 through 28, the operations further comprising: in response to a user action identifying a first portion of the translated text, highlighting in the user interface a first segment of the translated text to which the first portion of the translated text corresponds according to the first segmentation.

Embodiment 30 is related to the method of any one of embodiments 24 through 29, wherein receiving a translation further comprises receiving alignment data from the machine translation system that identifies portions of the source text that correspond to each of the two or more segments.

Embodiment 31 is related to the method of embodiment 30, the operations further comprising: in response to a user action identifying a fourth portion of the translated text, highlighting a portion of the source text corresponding to a fourth segment of the translated text, the fourth segment including the fourth portion of translated text.

Embodiment 32 is related to the method of embodiment 30 or 31, the operations further comprising: in response to a user action identifying a portion of the source text, highlighting a corresponding segment of the translated text.

Embodiment 33 is related to the method of any one of embodiments 24 through 32, wherein receiving a translation for the source language text includes receiving one or more alternative translations for each of the two or more segments of the first segmentation.

Embodiment 34 is related to the method of embodiment 33, the operations further comprising: in response to a user selection of a second portion of the translated text, presenting in the user interface one or more alternative translations for a second segment to which the second portion of the translated text corresponds according to the first segmentation.

Embodiment 35 is related to the method of embodiment 34, wherein receiving one or more alternative translations includes receiving a respective translation score for each alternative translation.

Embodiment 36 is related to the method of embodiment 35, the operations further comprising: presenting the one or more alternative translations in an order based on the respective translation scores.

Embodiment 37 is related to the method of any one of embodiments 34 through 36, the operations further comprising: in response to a user selection of one of the alternative translations, replacing the second segment with the selected alternative translation in the presented translation text.

Embodiment 38 is related to the method of any one of embodiments 24 through 37, wherein the segmentation data received from the machine translation system includes a plurality of possible segmentations of the translated text.

Embodiment 39 is related to the method of embodiment 38, wherein receiving a translation for the source language text includes receiving translations for each segment of each of the plurality of possible segmentations of the translated text.

Embodiment 40 is related to the method of embodiment 39, the operations further comprising: presenting a user interface feature allowing the user to set one of the plurality of possible segmentations to be the first segmentation.

Embodiment 41 is related to the method of embodiment 40, wherein the user interface feature is a plurality of radio buttons or a slider having a plurality of positions.

Embodiment 42 is related to the method of any one of embodiments 24 through 41, the operations further comprising: in response to a user selection of a fifth portion of translated text, presenting an input field to allow the user to enter a translation for the segment corresponding to the fifth portion of translated text.

Embodiment 43 is related to the method of any one of embodiments 24 through 42, further comprising: receiving a user selection of a third portion of the translated text; and receiving one or more alternative translations for the third portion of the translated text from the machine translation system, wherein the operations further comprise presenting the one or more alternative translations for the third portion of the translated text in the user interface.

Embodiment 44 is related to the method of any one of embodiments 24 through 43, further comprising: receiving data identifying a selected alternative translation or an entered alternative translation from the user device.

Embodiment 45 is related to the method of embodiment 44, further comprising: adding the received translation to training data for the machine translation system.

Embodiment 46 is related to the method of embodiment 44 or 45, wherein the received translation is a selected alternative translation and the method further comprises: adjusting a translation score for the received alternative translation.

Embodiment 47 is directed to a method performed by a system comprising one or more computers, the method comprising: receiving data identifying source language text; receiving a translation for the source language text from a machine translation system, the translation including translated text corresponding to the source language text and segmentation data for the translated text, wherein the segmentation data includes a first segmentation of the translated text, the first segmentation dividing the translated text into two or more segments; receiving one or more alternative translations for each of the two or more segments from the machine translation system; and sending the translated text to a user device for presentation in a user interface.

Embodiment 48 is related to the method of embodiment 47, further comprising: receiving data identifying a first portion of the translated text; and sending data identifying a first segment of the translated text corresponding to the first portion of the translated text according to the first segmentation to the user device.

Embodiment 49 is related to the method of embodiment 47 or 48, further comprising: receiving data identifying a second portion of the translated text; and sending the one or more alternative translations for a second segment of the translated text corresponding to the second portion to the user device for presentation in the user interface.

Embodiment 50 is related to the method of any one of embodiments 47 through 49, wherein receiving a translation further comprises receiving alignment data from the machine translation system that identifies portions of the source text that correspond to each of the two or more segments.

Embodiment 51 is related to the method of any one of embodiments 47 through 50, further comprising: receiving data identifying a third portion of the translated text; and sending data identifying a portion of the source language text that corresponds to a third segment of the translated text to the user device, the third segment including the third portion of the translated text.

Embodiment 52 is related to the method of any one of embodiments 47 through 51, further comprising: receiving data identifying a fourth portion of the translated text that does not correspond to any of the two or more segments associated with the first segmentation; receiving one or more alternative translations for the fourth portion of the translated text from the machine translation system; and sending the one or more alternative translations for the fourth portion to the user device for presentation in the user interface.

Embodiment 53 is directed to a system comprising: one or more computers and one or more storage devices storing instructions that when executed by the one or more computers cause the one or more computers to perform operations comprising: receiving source language text; receiving translated text corresponding to the source language text from a machine translation system; receiving segmentation data for the translated text, wherein the segmentation data includes a first segmentation of the translated text, the first segmentation dividing the translated text into two or more segments; and presenting the source text and the translated text to a user in a user interface.

Embodiment 54 is related to the system of embodiment 53, wherein the machine translation system is a statistical machine translation system.

Embodiment 55 is related to the system of embodiment 53 or 54, the operations further comprising: in response to a user action identifying a first portion of the translated text, highlighting, in the user interface, a first segment of the translated text to which the first portion of the translated text corresponds according to the first segmentation.

Embodiment 56 is related to the system of embodiment 55, wherein highlighting the first segment includes any one of displaying a box around the first segment, changing the color of the text of the first segment, or changing a background color of the first segment.

Embodiment 57 is related to the system of any one of embodiments 53 through 56, the operations further comprising: receiving one or more alternative translations for each of the two or more segments.

Embodiment 58 is related to the system of embodiment 57 the operations further comprising: in response to a user selection of a second portion of the translated text, displaying, in the user interface, one or more alternative translations for a second segment to which the second portion of translated text corresponds according to the first segmentation.

Embodiment 59 is related to the system of embodiment 58, the operations further comprising: in response to a user selection of an alternative translation, replacing the second segment with the selected alternative translation in the presented translated text.

Embodiment 60 is related to the system of embodiments 52 or 59, wherein each alternative translation is associated with a respective translation score, the method further comprising displaying alternative translations in an order based on the respective translation scores.

Embodiment 61 is related to the system of embodiments 59 or 60, the operations further comprising: transmitting to a translation server data identifying the selected alternative translation.

Embodiment 62 is related to the system of any one of embodiments 53 through 61, wherein the segmentation data includes a plurality of possible segmentations of the translated text.

Embodiment 63 is related to the system of embodiment 62, the operations further comprising: presenting a user interface feature allowing the user to select one of the plurality of possible segmentations.

Embodiment 64 is related to the system of embodiment 63, wherein the user interface feature is a plurality of radio buttons or a slider having a plurality of positions.

Embodiment 65 is related to the system of embodiment 64, the operations further comprising: in response to a user input selecting one of the plurality of possible segmentations, indicating the selected possible segmentation in the presented translated text.

Embodiment 66 is related to the system of embodiment 65 the operations further comprising: setting the selected possible segmentation to be the first segmentation.

Embodiment 67 is related to the system of any one of embodiments 53 through 61, further comprising: receiving alignment data identifying portions of the source text that correspond to each segment of the first segmentation.

Embodiment 68 is related to the system of any one of embodiments 62 through 66, the operations further comprising: receiving alignment data identifying portions of the source text that correspond to each segment of each received segmentation.

Embodiment 69 is related to the system of embodiment 67 or 68 the operations further comprising: in response to a user interaction with a fourth portion of the translated text, highlighting a portion of the source text that corresponds to a fourth segment of the translated text based on the alignment data, the fourth segment including the fourth portion of the translated text.

Embodiment 70 is related to the system of any one of embodiments 67, 68 or 69, the operations further comprising: in response to a user action identifying a portion of the source text, highlighting a corresponding segment of the translated text based on the alignment data.

Embodiment 71 is related to the system of any one of embodiments 53 through 70, the operations further comprising: in response to a user selection of a third portion of translated text that does not correspond to any of the two or more segments associated with the first segmentation, requesting one or more alternative translations for the third portion of translated text from the translation system; and displaying the one or more alternative translations for the third portion of translated text in the user interface.

Embodiment 72 is related to the system of embodiment 71, the operations further comprising: in response to a user selection of one of the alternative translations for the third portion of translated text, replacing the third portion of translated text with the selected alternative translation in the presented translated text.

Embodiment 73 is related to the system of any one of embodiments 58 through 70, the operations further comprising: in response to a user selection of a fifth portion of translated text, presenting an input field to allow the user to enter a translation for the segment corresponding to the fifth portion of translated text.

Embodiment 74 is related to the system of embodiment 73, the operations further comprising: replacing the segment corresponding to the fifth portion of translated text with the entered translation in the presented translated text.

Embodiment 75 is related to the system of embodiment 73 or 74, the operations further comprising: transmitting to a translation server data identifying the entered alternative translation.

Embodiment 76 is related to the system of any one of embodiments 53 through 75, further comprising: a server operable to perform any one of the methods of embodiments 24 through 46.

Embodiment 77 is related to the system of any one of embodiments 53 through 75, further comprising: a server operable to perform any one of the methods of embodiments 47 through 52.

Embodiment 78 is directed to a computer storage medium encoded with a computer program, the program comprising instructions that when executed by data processing apparatus cause the data processing apparatus to perform operations comprising: one or more computers and one or more storage devices storing instructions that when executed by the one or more computers cause the one or more computers to perform operations comprising: receiving source language text; receiving translated text corresponding to the source language text from a machine translation system; receiving segmentation data for the translated text, wherein the segmentation data includes a first segmentation of the translated text, the first segmentation dividing the translated text into two or more segments; and presenting the source text and the translated text to a user in a user interface.

Embodiment 79 is related to the computer storage medium of embodiment 78, wherein the machine translation system is a statistical machine translation system.

Embodiment 80 is related to the computer storage medium of embodiment 78 or 79, the operations further comprising: in response to a user action identifying a first portion of the translated text, highlighting, in the user interface, a first segment of the translated text to which the first portion of the translated text corresponds according to the first segmentation.

Embodiment 81 is related to the computer storage medium of embodiment 80, wherein highlighting the first segment includes any one of displaying a box around the first segment, changing the color of the text of the first segment, or changing a background color of the first segment.

Embodiment 82 is related to the computer storage medium of any one of embodiments 78 through 81, the operations further comprising: receiving one or more alternative translations for each of the two or more segments.

Embodiment 83 is related to the computer storage medium of embodiment 82 the operations further comprising: in response to a user selection of a second portion of the translated text, displaying, in the user interface, one or more alternative translations for a second segment to which the second portion of translated text corresponds according to the first segmentation.

Embodiment 84 is related to the computer storage medium of embodiment 83, the operations further comprising: in response to a user selection of an alternative translation, replacing the second segment with the selected alternative translation in the presented translated text.

Embodiment 85 is related to the computer storage medium of embodiments 83 or 84, wherein each alternative translation is associated with a respective translation score, the method further comprising displaying alternative translations in an order based on the respective translation scores.

Embodiment 86 is related to the computer storage medium of embodiments 84 or 85, the operations further comprising: transmitting to a translation server data identifying the selected alternative translation.

Embodiment 87 is related to the computer storage medium of any one of embodiments 78 through 86, wherein the segmentation data includes a plurality of possible segmentations of the translated text.

Embodiment 88 is related to the computer storage medium of embodiment 87, the operations further comprising: presenting a user interface feature allowing the user to select one of the plurality of possible segmentations.

Embodiment 89 is related to the computer storage medium of embodiment 88, wherein the user interface feature is a plurality of radio buttons or a slider having a plurality of positions.

Embodiment 90 is related to the computer storage medium of embodiment 89, the operations further comprising: in response to a user input selecting one of the plurality of possible segmentations, indicating the selected possible segmentation in the presented translated text.

Embodiment 91 is related to the computer storage medium of embodiment 90, the operations further comprising: setting the selected possible segmentation to be the first segmentation.

Embodiment 92 is related to the computer storage medium of any one of embodiments 78 through 86, the operations further comprising: receiving alignment data identifying portions of the source text that correspond to each segment of the first segmentation.

Embodiment 93 is related to the computer storage medium of any one of embodiments 87 through 91, the operations further comprising: receiving alignment data identifying portions of the source text that correspond to each segment of each received segmentation.

Embodiment 94 is related to the computer storage medium of embodiment 92 or 93 the operations further comprising: in response to a user interaction with a fourth portion of the translated text, highlighting a portion of the source text that corresponds to a fourth segment of the translated text based on the alignment data, the fourth segment including the fourth portion of the translated text.

Embodiment 95 is related to the computer storage medium of any one of embodiments 92, 93 or 94, the operations further comprising: in response to a user action identifying a portion of the source text, highlighting a corresponding segment of the translated text based on the alignment data.

Embodiment 96 is related to the computer storage medium of any one of embodiments 78 through 95, the operations further comprising: in response to a user selection of a third portion of translated text that does not correspond to any of the two or more segments associated with the first segmentation, requesting one or more alternative translations for the third portion of translated text from the translation system; and displaying the one or more alternative translations for the third portion of translated text in the user interface.

Embodiment 97 is related to the system of embodiment 96, the operations further comprising: in response to a user selection of one of the alternative translations for the third portion of translated text, replacing the third portion of translated text with the selected alternative translation in the presented translated text.

Embodiment 98 is related to the computer storage medium of any one of embodiments 58 through 97, the operations further comprising: in response to a user selection of a fifth portion of translated text, presenting an input field to allow the user to enter a translation for the segment corresponding to the fifth portion of translated text.

Embodiment 99 is related to the computer storage medium of embodiment 98, the operations further comprising: replacing the segment corresponding to the fifth portion of translated text with the entered translation in the presented translated text.

Embodiment 100 is related to the computer storage medium of embodiment 98 or 99, the operations further comprising: transmitting to a translation server data identifying the entered alternative translation.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
 receiving data identifying source language text;
 receiving a translation for the source language text from a machine translation system, the translation including translated text corresponding to the source language text and segmentation data for the translated text, wherein the segmentation data includes a plurality of possible segmentations of the translated text, the plurality of possible segmentations dividing the translated text into a plurality of segments;
 receiving one or more alternative translations for each of the plurality of segments of the plurality of possible segmentations; and
 sending executable instructions that, when executed by a user device, cause the user device to perform operations comprising:
  displaying a user interface;
  presenting the source language text and the translated text in the user interface;
  presenting, in the user interface, a slider having a plurality of positions, each position of the plurality of positions corresponding to one of the plurality of possible segmentations;

arranging the plurality of segmentations in an order from a smallest segmentation to a largest segmentation; and in response to a user input, presenting in the user interface each of the plurality of possible segmentations and the corresponding alternative translations for each of the plurality of possible segmentations, the user input providing for separately presenting each of the plurality of possible segmentations with their corresponding alternative translations, wherein moving the slider from a first position toward a second opposed position of the plurality of positions displays the switching starting with the smallest segmentation and progressing toward the largest segmentation.

2. The method of claim 1, wherein the data identifying source language text is received from the user device.

3. The method of claim 1, wherein the executable instructions are a client-side script, client-executable Java, or native client instructions executable on a native client.

4. The method of claim 1, wherein the machine translation system is a statistical machine translation system.

5. The method of claim 1, wherein receiving a translation further comprises receiving alignment data from the machine translation system that identifies portions of the source text that correspond to each of the plurality of possible segmentations.

6. The method of claim 5, the operations further comprising:

in response to a user action identifying a portion of the source text, highlighting a corresponding segment of the translated text.

7. The method of claim 1, wherein receiving one or more alternative translations includes receiving a respective translation score for each alternative translation; and the operations further comprise presenting the one or more alternative translations in an order based on the respective translation scores.

8. The method of claim 1, the operations further comprising:

in response to a user selection of one of the alternative translations, replacing the corresponding segment of the plurality of segments with the selected alternative translation in the presented translation text.

9. The method of claim 1, the operations further comprising:

in response to a user selection of a portion of the translated text, presenting an input field to allow the user to enter a translation for a segment of the plurality of segments corresponding to the portion of translated text.

10. The method of claim 1, further comprising:

receiving a user selection of a portion of the translated text; and receiving one or more alternative translations for the portion of the translated text from the machine translation system, wherein the operations further comprise presenting the one or more alternative translations for the portion of the translated text in the user interface.

11. The method of claim 1, further comprising:

receiving data identifying a selected alternative translation from the user device; and making the selected alternative translation available to the machine translation system.

12. A method performed by a system comprising one or more computers, the method comprising:

receiving data identifying source language text;

receiving a translation for the source language text from a machine translation system, the translation including translated text corresponding to the source language text and segmentation data for the translated text, wherein the segmentation data includes a plurality of possible segmentations of the translated text, the plurality of possible segmentations dividing the translated text into a plurality of segments;

receiving one or more alternative translations for each of the plurality of segments from the machine translation system;

sending executable instructions that, when executed by a user device, cause the user device to perform operations comprising:

displaying a user interface;

displaying the source language text and the translated text in the user interface of the user device;

presenting, in the user interface, a slider having a plurality of positions, each position of the plurality of positions corresponding to one of the plurality of possible segmentations;

arranging the plurality of segmentations in an order from a smallest segmentation to a largest segmentation; and displaying, upon receiving a user input via the slider, a switching between the plurality of possible segmentations, wherein for each one of the plurality of possible segmentations that are displayed during the switching, the corresponding alternative translations for that possible segmentation are also displayed, wherein moving the slider from a first toward a second opposed position of the plurality of positions displays the switching starting with the smallest segmentation and progressing toward the largest segmentation.

13. The method of claim 12, wherein receiving a translation further comprises receiving alignment data from the machine translation system that identifies portions of the source text that correspond to each of the plurality of possible segmentations.

14. The method of claim 13, the operations further comprising:

in response to a user action identifying a portion of the source text, highlighting a corresponding segment of the translated text.

15. The method of claim 12, wherein receiving one or more alternative translations includes receiving a respective translation score for each alternative translation; and the operations further comprise presenting the one or more alternative translations in an order based on the respective translation scores.

16. The method of claim 12, the operations further comprising:

in response to a user selection of one of the alternative translations, replacing the corresponding segment of the plurality of segments with the selected alternative translation in the presented translation text.

17. The method of claim 12, the operations further comprising:

in response to a user selection of a portion of the translated text, presenting an input field to allow the user to enter a translation for a segment of the plurality of segments corresponding to the portion of translated text.

18. The method of claim 12, further comprising:

receiving a user selection of a portion of the translated text; and receiving one or more alternative translations for the portion of the translated text from the machine translation system, wherein the operations further comprise presenting the one or more alternative translations for the portion of the translated text in the user interface.

19. The method of claim 12, further comprising:
receiving data identifying a selected alternative translation from the user device; and
making the selected alternative translation available to the machine translation system.

20. A system comprising:
one or more computers and one or more storage devices storing instructions that when executed by the one or more computers cause the one or more computers to perform operations comprising:
receiving data identifying source language text;
receiving a translation for the source language text from a machine translation system, the translation including translated text corresponding to the source language text and segmentation data for the translated text, wherein the segmentation data includes a plurality of possible segmentations of the translated text, the plurality of possible segmentations dividing the translated text into a plurality of segments;
receiving one or more alternative translations for each of the plurality of segments of the plurality of possible segmentations; and
sending executable instructions that, when executed by a user device, cause the user device to perform operations comprising:
displaying a user interface;
presenting the source language text and the translated text in the user interface;
presenting, in the user interface, a slider having a plurality of positions, each position of the plurality of positions corresponding to one of the plurality of possible segmentations;
arranging the plurality of segmentations in an order from a smallest segmentation to a largest segmentation; and
in response to a user input, presenting in the user interface each of the plurality of possible segmentations and the corresponding alternative translations for each of the plurality of possible segmentations, the user input providing for separately presenting each of the plurality of possible segmentations with their corresponding alternative translations,
wherein moving the slider from a first toward a second opposed position of the plurality of positions displays the switching starting with the smallest segmentation and progressing toward the largest segmentation.

21. The system of claim 20, wherein the data identifying source language text is received from the user device.

22. The system of claim 20, wherein the executable instructions are a client-side script, client-executable Java, or native client instructions executable on a native client.

23. The system of claim 20, wherein the machine translation system is a statistical machine translation system.

24. The system of claim 20, wherein receiving a translation further comprises receiving alignment data from the machine translation system that identifies portions of the source text that correspond to each of the plurality of possible segmentations.

25. The system of claim 24, wherein the executable instructions further cause the user device to:
in response to a user action identifying a portion of the source text, highlight a corresponding segment of the translated text.

26. The system of claim 20, wherein receiving one or more alternative translations includes receiving a respective translation score for each alternative translation; and
wherein the executable instructions further cause the user device to present the one or more alternative translations in an order based on the respective translation scores.

27. The system of claim 20, wherein the executable instructions further cause the user device to:
in response to a user selection of one of the alternative translations, replace the corresponding segment of the plurality of segments with the selected alternative translation in the presented translation text.

28. The system of claim 20, wherein the executable instructions further cause the user device to:
present a user interface feature facilitating the user input and allowing the user to select one of the plurality of possible segmentations.

29. The system of claim 20, wherein the executable instructions further cause the user device to:
in response to a user selection of a portion of translated text, present an input field to allow the user to enter a translation for a segment of the plurality of segments corresponding to the portion of translated text.

30. The system of claim 20, the operations further comprising:
receiving a user selection of a portion of the translated text; and
receiving one or more alternative translations for the portion of the translated text from the machine translation system, wherein the executable instructions further cause the user device to present the one or more alternative translations for the portion of the translated text in the user interface.

31. The system of claim 20, the operations further comprising:
receiving data identifying a selected alternative translation from the user device; and
making the selected alternative translation available to the machine translation system.

32. A system comprising:
operable and one or more storage devices storing instructions that when executed by the one or more computers cause the one or more computers to perform operations comprising:
receiving data identifying source language text;
receiving a translation for the source language text from a machine translation system, the translation including translated text corresponding to the source language text and segmentation data for the translated text, wherein the segmentation data includes a plurality of possible segmentations of the translated text, the plurality of possible segmentations dividing the translated text into a plurality of segments;
receiving one or more alternative translations for each of the plurality of segments from the machine translation system;
sending executable instructions that, when executed by a user device, cause the user device to perform operations comprising:
displaying a user interface;
displaying the source language text and the translated text in the user interface of the user device;
presenting, in the user interface, a slider having a plurality of positions, each position of the plurality of positions corresponding to one of the plurality of possible segmentations;

arranging the plurality of segmentations in an order from a smallest segmentation to a largest segmentation; and displaying, upon receiving a user input via the slider, a switching between the plurality of possible segmentations, wherein for each one of the plurality of possible segmentations that are displayed during the switching, the corresponding alternative translations for that possible segmentation are also displayed, wherein moving the slider from a first toward a second opposed position of the plurality of positions displays the switching starting with the smallest segmentation and progressing toward the largest segmentation.

33. The system of claim 32, wherein receiving a translation further comprises receiving alignment data from the machine translation system that identifies portions of the source text that correspond to each of the plurality of possible segmentations.

34. The system of claim 33, wherein the executable instructions further cause the user device to:

in response to a user action identifying a portion of the source text, highlight a corresponding segment of the translated text.

35. The system of claim 32, wherein receiving one or more alternative translations includes receiving a respective translation score for each alternative translation; and wherein the executable instructions further cause the user device to present the one or more alternative translations in an order based on the respective translation scores.

36. The system of claim 32, wherein the executable instructions further cause the user device to:

in response to a user selection of one of the alternative translations, replace the corresponding segment of the plurality of segments with the selected alternative translation in the presented translation text.

37. The system of claim 32, wherein the executable instructions further cause the user device to:

in response to a user selection of a portion of translated text, present an input field to allow the user to enter a translation for a segment of the plurality of segments corresponding to the portion of translated text.

38. The system of claim 32, the operations further comprising:

receiving data identifying a selected alternative translation from the user device; and making the selected alternative translation available to the machine translation system.

* * * * *